(12) United States Patent
Togashi

(10) Patent No.: US 8,310,806 B2
(45) Date of Patent: Nov. 13, 2012

(54) MULTILAYER CAPACITOR HAVING HIGH ESR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 477 days.

(21) Appl. No.: 12/275,674

(22) Filed: Nov. 21, 2008

(65) Prior Publication Data
US 2009/0168295 A1   Jul. 2, 2009

(30) Foreign Application Priority Data

Dec. 28, 2007  (JP) ................. 2007-340287

(51) Int. Cl.
*H01G 4/228* (2006.01)
*H01G 4/005* (2006.01)
*H01G 4/06* (2006.01)
(52) U.S. Cl. ............ 361/306.3; 361/303; 361/321.2
(58) Field of Classification Search .......... 361/303, 361/321.2, 306.3
See application file for complete search history.

(56) References Cited

U.S. PATENT DOCUMENTS

| | | | |
|---|---|---|---|
| 6,385,034 B2* | 5/2002 | Tanaka ............ | 361/306.3 |
| 6,765,781 B2* | 7/2004 | Togashi ............ | 361/306.3 |
| 6,798,640 B1* | 9/2004 | Novak ............ | 361/303 |
| 7,145,429 B1* | 12/2006 | Togashi et al. ........ | 336/200 |
| 7,149,071 B2* | 12/2006 | Mosley ............ | 361/306.3 |
| 7,280,342 B1* | 10/2007 | Randall et al. ........ | 361/303 |
| 7,411,776 B2* | 8/2008 | Aoki ............ | 361/306.3 |
| 8,045,319 B2* | 10/2011 | Ritter et al. ............ | 361/303 |
| 2006/0221546 A1 | 10/2006 | Togashi | |
| 2008/0310076 A1* | 12/2008 | Ritter et al. ............ | 361/302 |
| 2009/0086406 A1* | 4/2009 | Lee et al. ............ | 361/306.3 |

FOREIGN PATENT DOCUMENTS

JP   A-2006-286930   10/2006

* cited by examiner

*Primary Examiner* — David M Sinclair
(74) *Attorney, Agent, or Firm* — Oliff & Berridge, PLC

(57) ABSTRACT

A first inner electrode has a first main electrode, a first lead conductor, a first coupling conductor, and a second lead conductor. A second inner electrode has a second main electrode, a third lead conductor, and a second coupling conductor. A third inner electrode has a third main electrode, and a fourth lead conductor. The third inner electrode is connected to only a first connection conductor. In the extending direction of the first and third lead conductors, the first and second coupling conductors have a length shorter than the lengths of the first and third lead conductors and of the first and second main electrodes, respectively. The second inner electrode is adjacent to at least one of the first and third inner electrodes so as to sandwich the insulating layer.

5 Claims, 16 Drawing Sheets

(a)

(b)

(a)

(b)

(a)

(b)

(a)

(b)

MULTILAYER CAPACITOR HAVING HIGH ESR

BACKGROUND OF THE INVENTION

1. Field of the Invention

The present invention relates to a multilayer capacitor.

2. Related Background Art

A multilayer capacitor is known in Japanese Patent Laid-Open Publication No. 2006-286930. This multilayer capacitor includes a laminate body formed by alternately laminating an insulating layer, first inner electrodes, and second inner electrodes, and a first terminal electrode, a second terminal electrode, a first connection conductor and a second connection conductor on the outer surface of the laminate body. The first inner electrodes overlap with the second inner electrodes in the laminating direction. The first inner electrodes are connected to each other through the first connection conductor, while the second inner electrodes are connected to each other through the second connection conductor. Some of the first and second inner electrodes are integrated with a lead conductor, which is exposed from the side face of the laminate to be connected to the first and second terminal electrodes.

SUMMARY OF THE INVENTION

Nowadays trends in a power supply for a central processing unit (CPU) in a digital electronic device are an increase in load current and a low-voltage operation. Thus, a multilayer capacitor for decoupling is connected to a power supply. During the transitional change in a load current, a current is supplied from the multilayer capacitor to a CPU to reduce a change in the power supply voltage caused by a change in the load current. A high-frequency CPU has a fast and high load current. Accordingly, a multilayer capacitor for decoupling needs high capacitance and a high equivalent series resistance (ESR).

The multilayer capacitor in Japanese Patent Laid-Open Publication No. 2006-286930 includes a first inner electrode and a second inner electrode indirectly connected to a terminal electrode and connected to each other through a first connection conductor and a second connection conductor, respectively, in the laminate body, in addition to the first and second inner electrodes directly connected to the terminal electrode. This increases capacitance and ESR of this multilayer capacitor. However, since recent CPUs operate at a higher frequency, a multilayer capacitor having higher ESR has been expected.

Thus, it is an object of the present invention to provide a multilayer capacitor having higher ESR with enough capacitance.

A multilayer capacitor of the present invention includes a body having a plurality of laminated dielectric layers; a first inner electrode, a second inner electrode, and a third inner electrode, these layers being separated by the insulating layers in the body; and a first terminal electrode, a second terminal electrode, and a first connection conductor on the outer surface of the body. The first and second terminal electrodes and the first connection conductor are insulated from each other on the outer surface of the body. The first inner electrode has a first main electrode; a first lead conductor extending so as to define a gap between the first lead conductor and the first main electrode, exposed from the body, and connected to the first terminal electrode; a first coupling conductor connecting the first main electrode to the first lead conductor; and a second lead conductor extending from the first main electrode, exposed from the body, and connected to the first connection conductor. The second inner electrode has a second main electrode overlapping with the first main electrode, as viewed from the laminating direction of the insulating layers; a third lead conductor extending so as to define a gap between the third lead conductor and the second main electrode, exposed from the body, and connected to the second terminal electrode; and a second coupling conductor connecting the second main electrode to the third lead conductor. The third inner electrode has a third main electrode overlapping with the first and second main electrode, as viewed from the laminating direction; and a fourth lead conductor extending from the third main electrode, exposed from the body, and connected to the first connection conductor. The third inner electrode is connected to only the first connection conductor. The first coupling conductor has a length shorter than the lengths of the first lead conductor and of the main first electrode in the extending direction of the first lead conductor. The second coupling conductor has a length shorter than the lengths of the third lead conductor and of the second main electrode in the extending direction of the third lead conductor. The second inner electrode is adjacent to at least one of the first and third inner electrodes so as to sandwich the insulating layer.

The first inner electrode has the first main electrode, the first lead conductor, and the first coupling conductor, while the second inner electrode has the second main electrode, the third lead conductor, and the second coupling conductor. The first coupling conductor connects the first main electrode to the first lead conductor, while the second coupling conductor connects the second main electrode to the third lead conductor. In the extending direction of the first lead conductor, the first coupling conductor has a length shorter than the lengths of the first lead conductor and of the main first electrode. In the extending direction of the third lead conductor, the second coupling conductor has a length shorter than the lengths of the third lead conductor and of the second main electrode. In other words, paths between the first lead conductor and the first main electrode and between the third lead conductor and the second main electrode are narrow. In the multilayer capacitor, partial narrow current paths formed in the first and second inner electrodes increase its ESR.

The first inner electrode is connected to the first terminal electrode and the first connection conductor. The third inner electrode is connected to only the first connection conductor. In other words, the third inner electrode is indirectly connected to the first terminal electrode through the first inner electrode. This indirect connection of the inner electrodes to the terminal electrode ensures higher ESR of the multilayer capacitor.

The first to third main electrodes overlap with each other. The second inner electrode is adjacent to at least one of the first and third inner electrodes so as to sandwich the insulating layer. Thus, the second main electrode functions as a capacitor with at least one of the first and third main electrodes. Therefore, the multilayer capacitor surely can have capacitance. The present invention can provide a multilayer capacitor having higher ESR with enough capacitance.

Preferably, the second inner electrode is adjacent to the first inner electrode so as to sandwich the insulating layer.

In this case, the coupling conductor of the first inner electrode may be close to the coupling conductor of the second inner electrode. Such contiguous arrangement of these coupling conductors and countercurrents flowing in the coupling conductors can partially cancel magnetic fields caused by these currents. Therefore, the multilayer capacitor can have a reduced equivalent series inductance (ESL).

Preferably, the third inner electrode is adjacent to the second inner electrode so as to sandwich the insulating layer.

In this case, the second main electrode functions as a capacitor with the first and third main electrodes. Therefore, the multilayer capacitor surely can have capacitance.

Preferably, the multilayer capacitor further includes a second connection conductor on the outer surface of the body, the second connection conductor being insulated from the first and second terminal electrodes and the first connection conductor; and a fourth inner electrode separated by the insulating layers in the body. The second inner electrode further has a fifth lead conductor extending from the second main electrode, exposed from the body, and connected to the second connection conductor. The fourth inner electrode has a fourth main electrode overlapping with the first to third main electrodes, as viewed from the laminating direction; and a sixth lead conductor extending from the fourth main electrode, exposed from the body, and connected to the second connection conductor. The fourth inner electrode is connected to only the second connection conductor.

In this case, the fourth inner electrode is connected to only the second connection conductor. The fourth inner electrode is indirectly connected to the second terminal electrode through the second inner electrode. This indirect connection of the inner electrodes to the second terminal electrode ensures higher ESR of the multilayer capacitor.

Preferably, the fourth inner electrode is adjacent to at least one of the first and third inner electrodes so as to sandwich the insulating layer.

In this case, the fourth main electrode functions as a capacitor with at least one of the first and third main electrodes. Therefore, the multilayer capacitor surely can have higher capacitance.

Preferably, the body includes a first side face parallel to the laminating direction. Preferably, in the first inner electrode, the first coupling conductor extends from the edge of the first main electrode adjacent to the first side face toward the first side face, the first lead conductor extending along the first side face. Preferably, in the second inner electrode, the second coupling conductor extends from the edge of the second main electrode adjacent to the first side face toward the first side face, the third lead conductor extending along the first side face.

In this case, the first and second coupling conductors extend from the first and second main electrodes, respectively, toward the first side face. The first and second coupling conductors are connected to the first and second terminal electrodes, respectively, through the lead conductor, the first and second terminal electrodes having a different polarity. Countercurrents flow in the first and second coupling conductors close to each other, extending along the same direction, and having a different polarity during applying a voltage. This can partially cancel magnetic fields caused by these currents. Therefore, the multilayer capacitor surely can have a lower ESL.

Preferably, the body further includes a second side face parallel to the laminating direction and a third side face facing the second side face, the second and third side faces being connected to the first side face. The first terminal electrode is continuously formed on the first and second side face, while the second terminal electrode is continuously formed on the first and third side face. The first and third lead conductors are exposed from the first side face, and are connected to the first and second terminal electrodes, respectively. The first inner electrode further has a seventh lead conductor connected to the first lead conductor, the seventh lead conductor extending along the second side face so as to define a gap between the seventh lead conductor and the first main electrode, being exposed from the second side face, and being connected to the first terminal electrode. The second inner electrode further has a eighth lead conductor connected the third lead conductor, the eighth lead conductor extending along the third side face so as to define a gap between the eighth lead conductor and the second main electrode, being exposed from the third side face, and being connected to the second terminal electrode.

In this case, the first and seventh lead conductors in the first inner electrode are connected to the first terminal electrode, while the third and eighth lead conductors in the second inner electrode are connected to the second terminal electrode. This increases contact areas between the first inner electrode and the first terminal electrode and between the second inner electrode and the second terminal electrode, thereby improving connectivity between the first inner electrode and the first terminal electrode and between the second inner electrode and the second terminal electrode.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
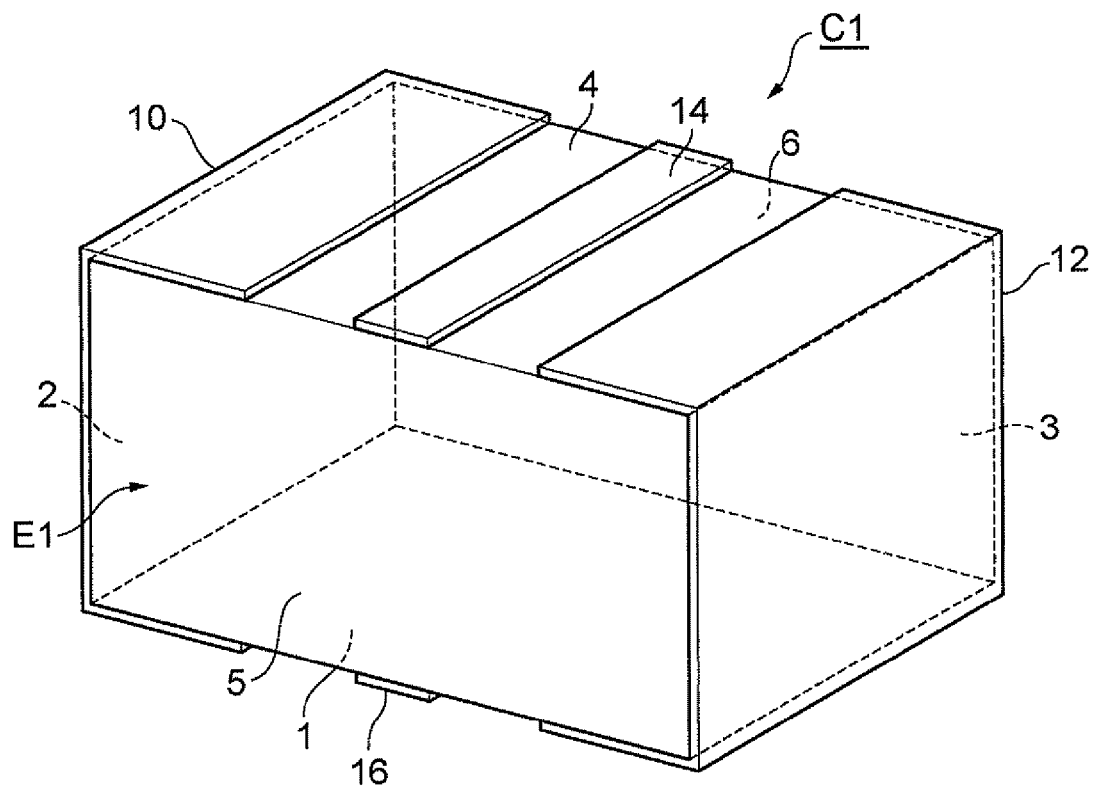
FIG. 1 is a perspective view of a multilayer capacitor in a first embodiment.

Preferred embodiments of the present invention will be described below with reference to the accompanying drawings in detail. In these descriptions, the same elements or elements having the same functions are denoted by the same reference numerals without repetitive description.

First Embodiment

Figure 2:
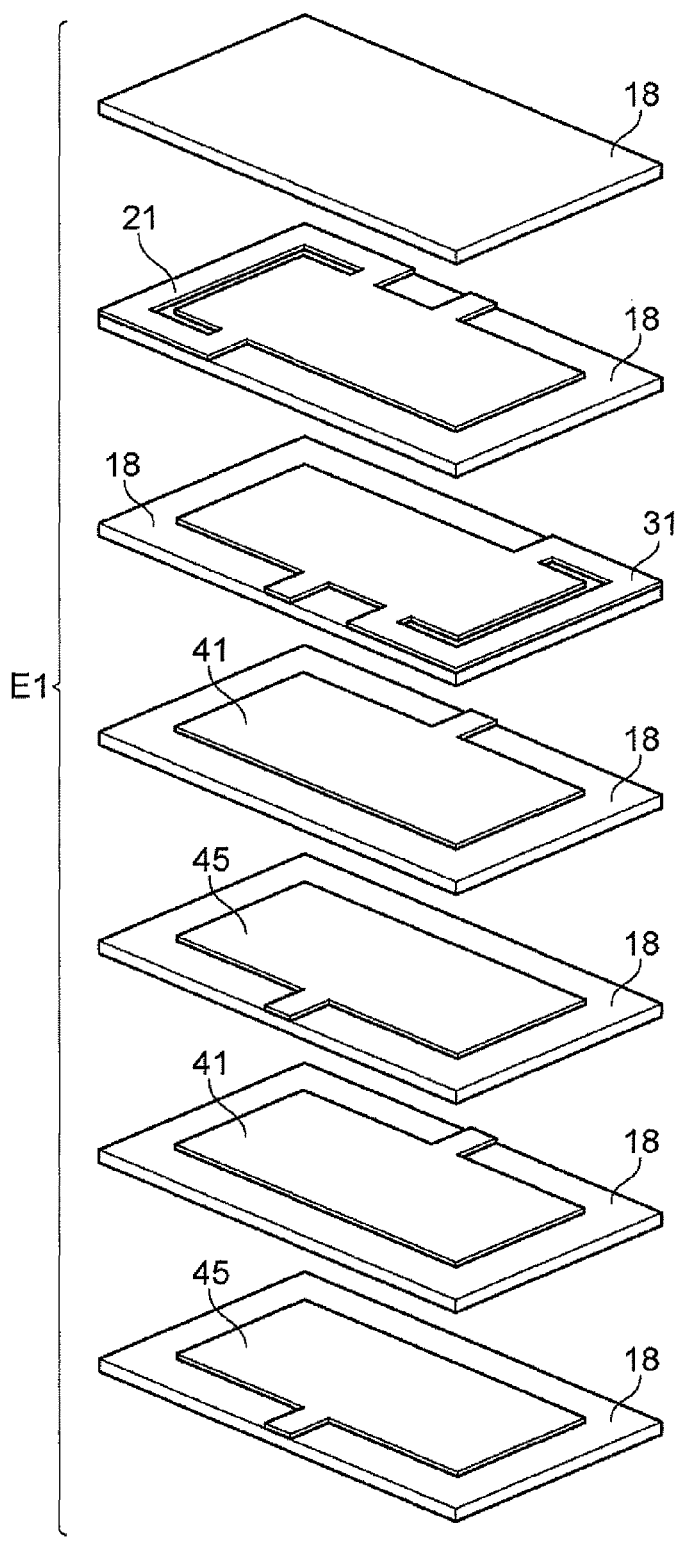
FIG. 2 is a perspective exploded view of the body of the multilayer capacitor in the first embodiment.
Figure 3:
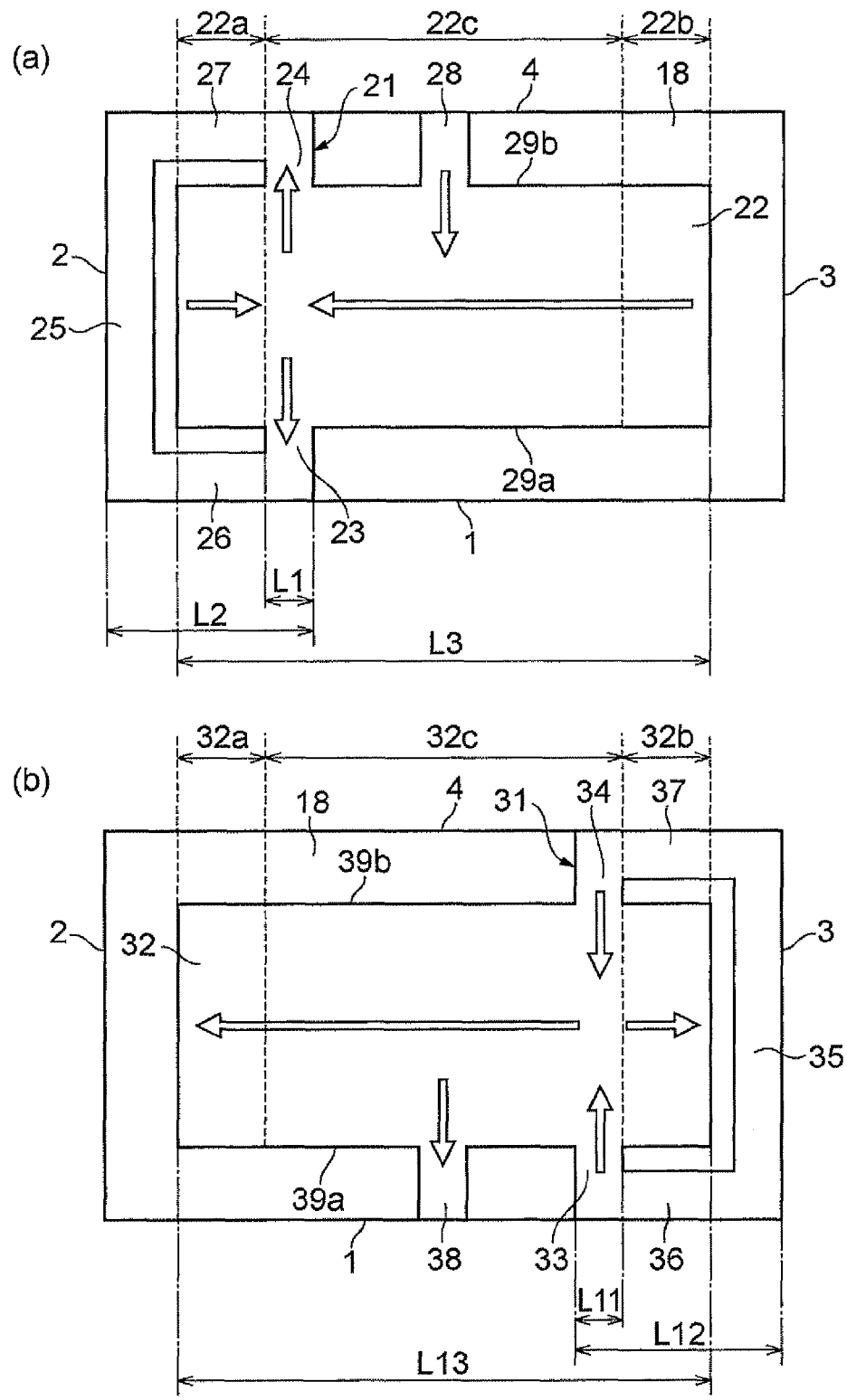
FIG. 3 shows the structures of inner electrodes of the multilayer capacitor in the first embodiment.
Figure 4:
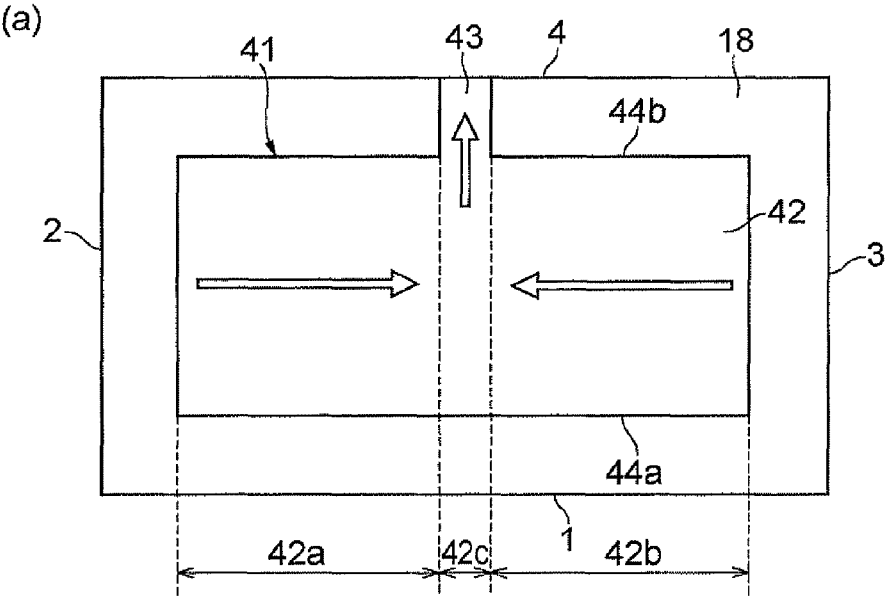
FIG. 4 shows the structures of inner electrodes of the multilayer capacitor in the first embodiment.
Figure 4:
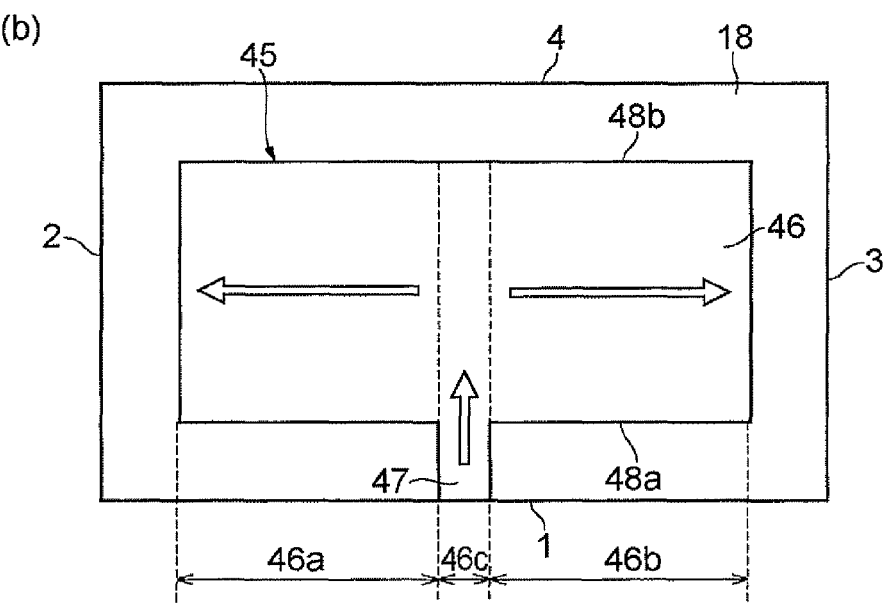

FIG. 1 is a perspective view of a multilayer capacitor in a first embodiment. FIG. 2 is a perspective exploded view of the body of the multilayer capacitor in the first embodiment. FIGS. 3 and 4 show the structures of inner electrodes of the multilayer capacitor in the first embodiment.

A multilayer capacitor C1 includes a substantially rectangular solid body E1, a first terminal electrode 10, a second terminal electrode 12, a first connection conductor 14, and a second connection conductor 16, disposed on the outer surfaces of the body E1.

The body E1 has side faces 1 to 6. The side face 1 faces the side face 4, the side face 2 faces the side face 3, and the side face 5 faces the side face 6. The side faces 1 and 4 extend in the direction of the long sides of the rectangular side faces 5 and 6 so as to connect the side faces 5 and 6. The side faces 2 and 3 extend in the direction of the short sides of the side faces 5 and 6 so as to connect the side faces 5 and 6. The multilayer capacitor C1 of this embodiment is disposed on a mounting substrate such that the side face 1 faces the mounting substrate.

The first and second terminal electrodes 10 and 12, and the first and second connection conductors 14 and 16 are insulated from each other on the outer surfaces of the body E1. The first terminal electrode 10 is disposed so as to cover the entire side face 2, and the edges, adjacent to the side face 2, of the side faces 1 and 4. The second terminal electrode 12 is disposed so as to cover the entire side face 3, and the edges, adjacent to the side face 3, of the side faces 1 and 4. The first connection conductor 14 is disposed between the first and second terminal electrodes 10 and 12 on the side face 4, and extends toward the side faces 5 and 6. The second connection conductor 16 is disposed between the first and second terminal electrodes 10 and 12 on the side face 1, and extends toward the side faces 5 and 6.

The first and second terminal electrodes 10 and 12, respectively, and the first and second connection conductors 14 and 16, respectively, are formed by, for example, applying a conductive paste composed of conductive metal powder and glass frit on the respective outer surfaces of the body E1 followed by sintering it. A plating layer may also be formed on the sintered electrode as needed.

With reference to FIG. 2, the body E1 is formed by laminating rectangular insulating layers 18 (seven layers in this embodiment). The side faces 1 to 4 are parallel to the laminating direction of the insulating layers 18, and the side faces 5 and 6 are perpendicular to the laminating direction of the insulating layers 18. Each insulating layer 18 is formed of, for example, a sinter from a ceramic green sheet composed of a dielectric ceramic. In the actual multilayer capacitor C1, the insulating layers 18 are combined so that boundaries between the insulating layers 18 cannot be visible.

With reference to FIG. 2, the multilayer capacitor C1 includes a first inner electrode 21, a second inner electrode 31, third inner electrodes 41 (two electrodes in this embodiment), and fourth inner electrodes 45 (two electrodes in this embodiment) in the body E1. In the multilayer capacitor C1 of this embodiment, the first inner electrode 21, the second inner electrode 31, the third inner electrode 41, the fourth inner electrode 45, the third inner electrode 41, and the fourth inner electrode 45 are laminated in that order, these layers being separated by the insulating layers 18. These inner electrodes are composed of a sinter of a conductive paste.

The first inner electrode 21 and the adjacent second inner electrode 31 sandwich the insulating layer 18. With reference to FIG. 3(a), the first inner electrode 21 has a main electrode 22, coupling conductors 23 and 24, and lead conductors 25 to 28.

The rectangular main electrode 22 has long sides along the long sides of the side faces 5 and 6. The main electrode 22 includes a pair of edges 29a and 29b extending in the direction of its long sides. The edges 29a and 29b are adjacent to the side faces 1 and 4, respectively.

The main electrode 22 includes a region functioning as a capacitor. The region functioning as a capacitor overlaps with a main electrode 32 of the second inner electrode 31 described below, as viewed from the laminating direction of the insulating layers 18. In this embodiment, the main electrode 22 entirely overlaps with the main electrode 32. Therefore, the substantially entire region of the main electrode 22 functions as a capacitor. The region functioning as a capacitor in the first inner electrode 21, in other words, the main electrode 22 includes edges 22a and 22b, and a central region 22c. The edges 22a and 22b are adjacent to the side faces 2 and 3 of the body E1, respectively. The central region 22c is disposed between the edges 22a and 22b.

The coupling conductor 23 is adjacent to the side face 1 and is connected to the main electrode 22. The coupling conductor 23 extends from the edge 29a of the main electrode 22 to the side face 1 of the body E1. The coupling conductor 23 is connected to a region close to the side face 2 of the body E1, in the central region 22c of the main electrode 22.

The lead conductor 26 has an end connected to the coupling conductor 23, and extends to the side face 2 along the side face 1 of the body E1 so as to define a gap between the lead conductor 26 and the main electrode 22. In the lead conductor 26, its edge adjacent to the side face 1 is exposed from the side face 1 to be electrically and physically connected to the first terminal electrode 10. In the extending direction of the lead conductor 26, the coupling conductor 23 has a length L1 shorter than the length L2 of the lead conductor 26 and the length L3 of the main electrode 22.

The coupling conductor 24 is adjacent to the side face 4 and is connected to the main electrode 22. The coupling conductor 24 extends from the edge 29b of the main electrode 22 to the side face 4 of the body E1. The coupling conductor 24 is connected to a region close to the side face 2 of the body E1, in the central region 22c of the main electrode 22.

The lead conductor 27 has an end connected to the coupling conductor 24, and extends to the side face 2 along the side face 4 of the body E1 so as to define a gap between the lead conductor 27 and the main electrode 22. In the lead conductor 27, its edge adjacent to the side face 4 is exposed from the side face 4 to be electrically and physically connected to the first terminal electrode 10. In the extending direction of the lead conductor 27, the coupling conductor 24 has a length shorter than the lengths of the lead conductor 27 and of the main electrode 22.

The lead conductor 25 is connected to the lead conductors 26 and 27. More specifically, one end of the lead conductor 25 is connected to the lead conductor 26, and the other end of the lead conductor 25 is connected to the lead conductor 27. The lead conductor 25 extends along the side face 2 of the body E1 so as to define a gap between the lead conductor 25 and the main electrode 22. In the lead conductor 25, its edge adjacent to the side face 2 is exposed from the side face 2 to be electrically and physically connected to the first terminal electrode 10.

The lead conductor 28 extends from the main electrode 22 to the side face 4. One end of the lead conductor 28 is connected to the main electrode 22, and the other end of the lead conductor 28 is exposed from the side face 4 to be electrically and physically connected to the first connection conductor 14. The lead conductor 28 extends from the edge 29b of the main electrode 22 to the side face 4 of the body E1. The lead conductor 28 is disposed between the coupling conductors 23 and 33, as viewed from the direction perpendicular to the side faces 1 and 4 (the opposed direction of the side faces 1 and 4). The lead conductor 28 is also disposed between the coupling conductors 24 and 34, as viewed from the direction perpendicular to the side faces 1 and 4.

With reference to FIG. 3(b), the second inner electrode 31 has a main electrode 32, coupling conductors 33 and 34, and lead conductors 35 to 38.

The rectangular main electrode 32 has long sides along the long sides of the side faces 5 and 6. The main electrode 32 includes a pair of edges 39a and 39b extending in its longitudinal direction. The edges 39a and 39b are disposed adjacent to the side faces 1 and 4, respectively.

The main electrode 32 includes a region functioning as a capacitor. The region functioning as a capacitor overlaps with the main electrode 22 of the first inner electrode 21, as viewed from the laminating direction of the insulating layers 18. In this embodiment, the main electrode 22 entirely overlaps with the main electrode 32. Therefore, the substantially entire region of the main electrode 32 functions as a capacitor. The region functioning as a capacitor in the second inner electrode 31, in other words, the main electrode 32 includes edges 32a and 32b, and a central region 32c. The edges 32a and 32b are adjacent to the side faces 2 and 3 of the body E1, respectively. The central region 32c is disposed between the edges 32a and 32b.

The coupling conductor 33 is adjacent to the side face 1 and is connected to the main electrode 32. The coupling conductor 33 extends from the edge 39a of the main electrode 32 toward the side face 1 of the body E1. The coupling conductor 33 is connected to the central region 32c of the main electrode 32 in the vicinity of the side face 3 of the body E1.

The lead conductor 36 has an end connected to the coupling conductor 33, and extends toward the side face 3 along the side face 1 of the body E1 so as to define a gap between the lead conductor 36 and the main electrode 32. In the lead conductor 36, its edge adjacent to the side face 1 is exposed from the side face 1 to be electrically and physically connected to the second terminal electrode 12. In the extending direction of the lead conductor 36, the coupling conductor 33 has a length L11 shorter than the length L12 of the lead conductor 36 and the length L13 of the main electrode 32.

The coupling conductor 34 is adjacent to the side face 4 and is connected to the main electrode 32. The coupling conductor 34 extends from the edge 39b of the main electrode 32 toward the side face 4 of the body E1. The coupling conductor 34 is connected to the central region 32c of the main electrode 32 in the vicinity of the side face of the body E1.

The lead conductor 37 has an end connected to the coupling conductor 34, and extends to the side face 3 along the side face 4 of the body E1 so as to define a gap between the lead conductor 37 and the main electrode 32. In the lead conductor 37, its edge adjacent to the side face 4 is exposed from the side face 4 to be electrically and physically connected to the second terminal electrode 12. In the extending direction of the lead conductor 37, the coupling conductor 34 has a length shorter than the lengths of the lead conductor 37 and of the main electrode 32.

The lead conductor 35 is connected to both the lead conductors 36 and 37. More specifically, one end of the lead conductor 35 is connected to the lead conductor 36, and the other end of the lead conductor 35 is connected to the lead conductor 37. The lead conductor 35 extends along the side face 3 of the body E1 so as to define a gap between the lead conductor 35 and the main electrode 32. In the lead conductor 35, its edge adjacent to the side face 3 is exposed from the side face 3 to be electrically and physically connected to the second terminal electrode 12.

The lead conductor 38 extends from the main electrode 32 to the side face 1. One end of the lead conductor 38 is connected to the main electrode 32, and the other end of the lead conductor 38 is exposed from the side face 1 to be electrically and physically connected to the second connection conductor 16. The lead conductor 38 extends from the edge 39a of the main electrode 32 toward the side face 1 of the body E1 The lead conductor 38 is disposed between the coupling conductors 23 and 33, as viewed from the direction perpendicular to the side faces 1 and 4. The lead conductor 38 is also disposed between the coupling conductors 24 and 34, as viewed from the direction perpendicular to the side faces 1 and 4.

With reference to FIG. 4(a), the third inner electrode 41 has a main electrode 42 and a lead conductor 43.

The rectangular main electrode 42 has long sides along the long sides of the side faces 5 and 6. The main electrode 42 includes a pair of edges 44a and 44b extending in its longitudinal direction. The edges 44a and 44b are adjacent to the side faces 1 and 4, respectively.

The main electrode 42 includes a region functioning as a capacitor. The region functioning as a capacitor overlaps with the main electrode 22 of the first inner electrode 21, the main electrode 32 of the second inner electrode 31, and a main electrode 46 of a fourth inner electrode 45 described below, as viewed from the laminating direction of the insulating layers 18. In this embodiment, the main electrode 42 entirely overlaps with the main electrodes 22, 32, and 46. Therefore, the substantially entire region of the main electrode 42 functions as a capacitor. The region functioning as a capacitor in the third inner electrode 41, in other words, the main electrode 42 has edges 42a and 42b, and a central region 42c. The edges 42a and 42b are adjacent to the side faces 2 and 3 of the body E1, respectively. The central region 42c is disposed between the edges 42a and 42b.

The lead conductor 43 extends from the main electrode 32 to the side face 4. One end of the lead conductor 43 is connected to the main electrode 42, and the other end of the lead conductor 43 is exposed from the side face 4 to be electrically and physically connected to the first connection conductor 14. The lead conductor 43 extends from the edge 44b of the main electrode 42 to the side face 4 of the body E1. The lead conductor 43 is disposed between the coupling conductors 23 and 33, as viewed from the direction perpendicular to the side faces 1 and 4. The lead conductor 43 is also disposed between the coupling conductors 24 and 34, as viewed from the direction perpendicular to the side faces 1 and 4.

With reference to FIG. 4(b), the fourth inner electrode 45 has a main electrode 46 and a lead conductor 47.

The rectangular main electrode 46 has long sides along the long sides of the side faces 5 and 6. The main electrode 46 includes a pair of edges 48a and 48b extending in its longitudinal direction. The edges 48a and 48b are adjacent to the side faces 1 and 4, respectively.

The main electrode 46 includes a region functioning as a capacitor. The region functioning as a capacitor overlaps with the main electrode 22 of the first inner electrode 21, the main electrode 32 of the second inner electrode 31, and the main electrode 42 of the third inner electrode 41, as viewed from the laminating direction of the insulating layers 18. In this embodiment, the main electrode 46 entirely overlaps with the main electrodes 22, 32, and 42. Therefore, the substantially entire region of the main electrode 46 functions as a capacitor. The region functioning as a capacitor in the fourth inner electrode 45, in other words, the main electrode 46 includes edges 46a and 46b, and a central region 46c. The edges 46a and 46b are adjacent to the side faces 2 and 3 of the body E1, respectively. The central region 46c is disposed between the edges 46a and 46b.

The lead conductor 47 is adjacent to the side face 1. One end of the lead conductor 47 is connected to the main electrode 46, and the other end of the lead conductor 47 is exposed from the side face 1 to be electrically and physically connected to the second connection conductor 16. The lead conductor 47 extends from the edge 48a of the main electrode 46 to the side face 1 of the body E1. The lead conductor 47 is disposed between the coupling conductors 23 and 33, as viewed from the direction perpendicular to the side faces 1 and 4. The lead conductor 47 is also disposed between the coupling conductors 24 and 34, as viewed from the direction perpendicular to the side faces 1 and 4.

In the multilayer capacitor C1 of this embodiment having the structure described above, the coupling conductors 23 and 33 connect the lead conductors 26 and 36 to the main electrodes 22 and 32 in the first and second inner electrodes 21 and 31, respectively. In the extending direction of the lead conductor 26, the coupling conductor 23 has a length shorter than the lengths of the lead conductor 26 and the main electrode 22. In the extending direction of the lead conductor 36, the coupling conductor 33 has a length shorter than the lengths of the lead conductor 36 and the main electrode 32. In other words, paths between the lead conductor 26 and the main electrode 22 and between the lead conductor 36 and the main electrode 32 are narrow. Accordingly, in the multilayer capacitor C1, partial narrow current paths formed in the first and second inner electrodes 21 and 31 increase its ESR.

The first inner electrode 21 is connected to the first terminal electrode 10 and the first connection conductor 14. The third inner electrode 41 is not connected to the first terminal electrode 10, but is connected to only the first connection conductor 14. In other words, the third inner electrode 41 is indirectly connected to the first terminal electrode 10 through the first inner electrode 21. This indirect connection of the inner electrodes to the first terminal electrode 10 ensures higher ESR of the multilayer capacitor C1.

The main electrodes 22 and 32 overlap with each other, as viewed from the laminating direction, and are adjacent to each other so as to sandwich the insulating layer 18. The main electrodes 22 and 32 connected to different terminal electrodes form a capacitance component during applying a voltage. Therefore, the multilayer capacitor C1 surely can have capacitance.

The main electrodes 42 and 32 overlap with each other, as viewed from the laminating direction, and are adjacent to each other so as to sandwich the insulating layer 18. The main electrodes 42 and 32 connected to different terminal electrodes form a capacitance component during applying a voltage. Therefore, the multilayer capacitor C1 surely can have capacitance.

The main electrodes 46 and 42 overlap with each other, and are adjacent to each other so as to sandwich the insulating layer 18. The main electrodes 46 and 42 connected to different terminal electrodes form a capacitance component during applying a voltage. Therefore, the multilayer capacitor C1 surely can have higher capacitance.

The multilayer capacitor C1 includes the fourth inner electrode 45 connected only to the second connection conductor 16. The fourth inner electrode 45 is indirectly connected to the second terminal electrode 12 through the second connection conductor 16 and the second inner electrode 31. This indirect connection of the inner electrodes to the second terminal electrode 12 ensures higher ESR of the multilayer capacitor C1.

In the first inner electrode 21, the coupling conductor 23 is connected to the edge 29a of the main electrode 22, and extends to the side face 1 of the body E1. In the second inner electrode 31, the coupling conductor 33 is connected to the edge 39a of the main electrode 32, and extends to the side face 1 of the body E1. Therefore, the coupling conductors 23 and 33 are substantially parallel to each other, as viewed from the laminating direction. The coupling conductor 23 is connected to the first terminal electrode 10, while the coupling conductor 33 is connected to the second terminal electrode 12 having a different polarity from that of the first terminal electrode 10. Therefore, a current in the coupling conductor 23 flows in the opposite direction to that in the coupling conductor 33 during applying a voltage to the multilayer capacitor C1. Since the first and second inner electrodes 21 and 31 are laminated so as to be adjacent to each other so as to sandwich the insulating layer 18, the coupling conductors 23 and 33 are close to each other. Such contiguous arrangement of the coupling conductors 23 and 33 and countercurrents flowing in these layers can partially cancel magnetic fields caused by these currents. Therefore, the multilayer capacitor C1 can also have a reduced ESL. Arrows in FIG. 3 indicate directions of currents when the first terminal electrode 10 is used as a cathode and the second terminal electrode 12 as an anode.

The first terminal electrode 10 is formed on the side faces 1 and 2 of the body E1. The second terminal electrode 12 is formed on the side faces 1 and 3 of the body E1. The first inner electrode 21 has the lead conductor 25 exposed from the side face 2 of the body E1. The second inner electrode 31 has the lead conductor 35 exposed from the side face 3 of the body E1. This increases contact areas between the first inner electrode 21 and the first terminal electrode 10 and between the second inner electrode 31 and the second terminal electrode 12, thereby improving connectivity between the first inner electrode 21 and the first terminal electrode 10 and between the second inner electrode 31 and the second terminal electrode 12.

When the multilayer capacitor C1 is disposed on the mounting substrate such that the side face 1 faces the mounting substrate, a relatively long current path through the lead conductors 25 and 27 and the coupling conductor 24 to the main electrode 22 is formed in addition to a current path through the lead conductor 26 and the coupling conductor 23 to the main electrode 22. This relatively long current path can provide a higher ESR. When the multilayer capacitor C1 is disposed on the mounting substrate such that the side face 1 faces the mounting substrate, its ESL can be reduced, for example, compared to the multilayer capacitor that is disposed on the mounting substrate such that the side face 5 faces the mounting substrate.

In the multilayer capacitor C1, the lead conductors 28 and 43, respectively, extend from the edges 29b and 44b of the main electrodes 22 and 42 adjacent to side face 4 toward the side face 4, while the lead conductors 38 and 47, respectively, extend from the edges 39a and 48a of the main electrodes 32 and 46 adjacent to side face 1 toward the side face 1. Since the lead conductors 28, 43, 38 and 47 are separately exposed on two side faces instead of one side face, the distance between the coupling conductors 23 and 33 and the distance between the coupling conductors 24 and 34 can be reduced, as viewed from the laminating direction. Since countercurrents flow in the coupling conductors 23 and 33 and in the coupling conductors 24 and 34, magnetic fields caused by the currents are cancelled between the coupling conductors 23 and 33 and between the coupling conductors 24 and 34. As a result, the ESL can be reduced.

In the multilayer capacitor C1, a current path through the lead conductor 27 and the coupling conductor 24 to the main electrode 22 is formed in addition to a current path through the lead conductor 26 and the coupling conductor 23 to the main electrodes 22. These multiple current paths can provide a lower ESL.

Arrows in FIGS. 3 and 4 indicate directions of currents when the first terminal electrode 10 is used as a cathode and the second terminal electrode 12 as an anode. In the multilayer capacitor C1, countercurrents flow in the edges 22a and 22b in the main electrode 22 of the first inner electrode 21 and flow in the edges 32a and 32b in the main electrode 32 of the second inner electrode 31. This partially cancels magnetic fields caused by the currents in the first and second inner electrodes 21 and 31. Countercurrents flow in the edges 42a and 42b in the main electrode 42 of the third inner electrode 41 and flow in the edges 46a and 46b in the main electrode 46 of the fourth inner electrode 45. This partially cancels magnetic fields caused by the currents in the third and fourth inner electrodes 41 and 45. The magnetic fields cancelled in the adjacent inner electrodes can further reduce the ESL.

Figure 5:
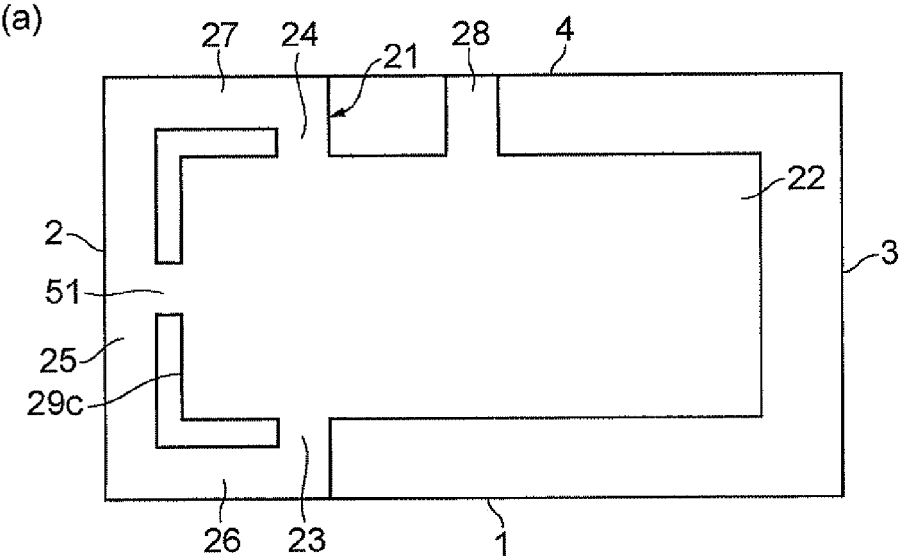
FIG. 5 shows the structures of inner electrodes of multilayer capacitor in a variation of the first embodiment.
Figure 5:
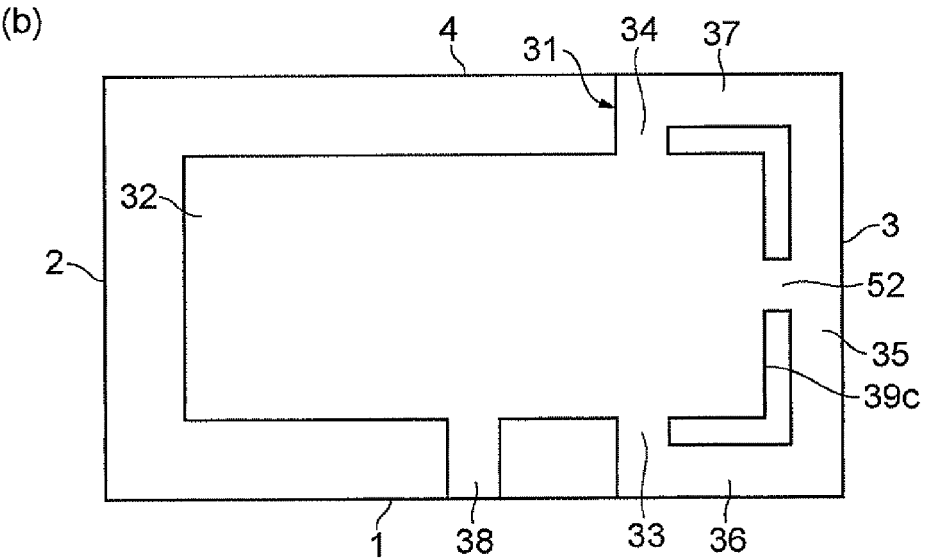

With reference to FIG. 5, a variation of the first embodiment will be described. FIG. 5 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 5, the shapes of the first and second inner electrodes 21 and 31 of the multilayer capacitor of this variation are different from those of the first embodiment.

The first inner electrode 21 of this variation has a coupling conductor 51, in addition to a main electrode 22, coupling conductors 23 and 24, and lead conductors 25 to 28, which are included in the first inner electrode 21 of the first embodiment. The coupling conductor 51 is adjacent to a side face 2 of the body E1 than the main electrode 22, and is connected to the main electrode 22. One end of the coupling conductor 51 is connected to an edge 29c of the main electrode 22 adjacent to the side face 2, and the other end of the coupling conductor 51 is connected to the lead conductor 25.

The second inner electrode 31 of this variation has a coupling conductor 52, in addition to a main electrode 32, coupling conductors 33 and 34, and lead conductors 35 to 38, which are included in the second inner electrode 31 of the first embodiment. The coupling conductor 52 is adjacent to a side face 3 of the body E1 than the main electrode 32, and is connected to the main electrode 32. One end of the coupling conductor 52 is connected to an edge 39c of the main electrode 32 adjacent to the side face 3, and the other end of the coupling conductor 52 is connected to the lead conductor 35.

In the multilayer capacitor of this variation, partial narrow current paths are also formed in the first and second inner electrodes 21 and 31, and the third and fourth inner electrodes 41 and 45 are indirectly connected to the first and second terminal electrodes 10 and 12, thereby increasing its ESR.

Figure 6:
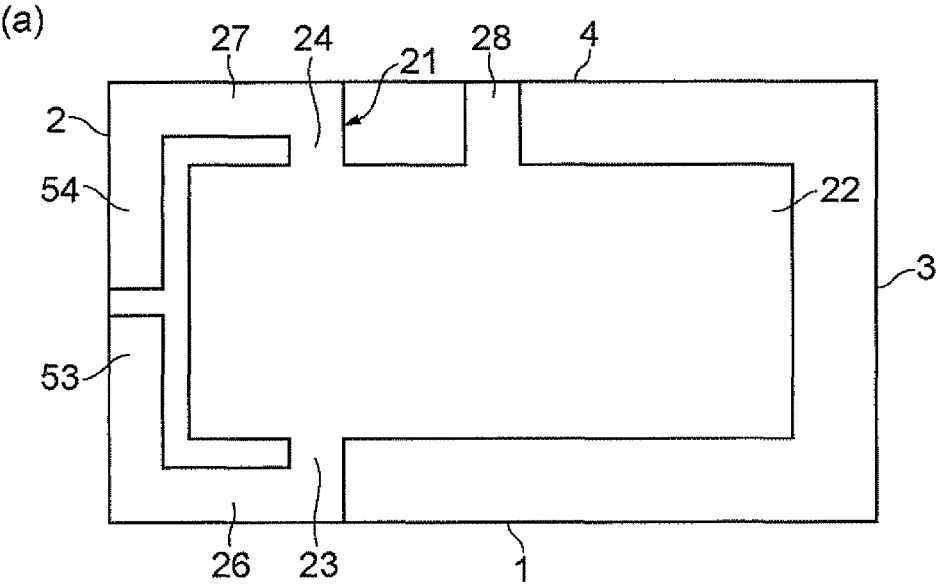
FIG. 6 shows the structures of inner electrodes of multilayer capacitor in another variation of the first embodiment.
Figure 6:
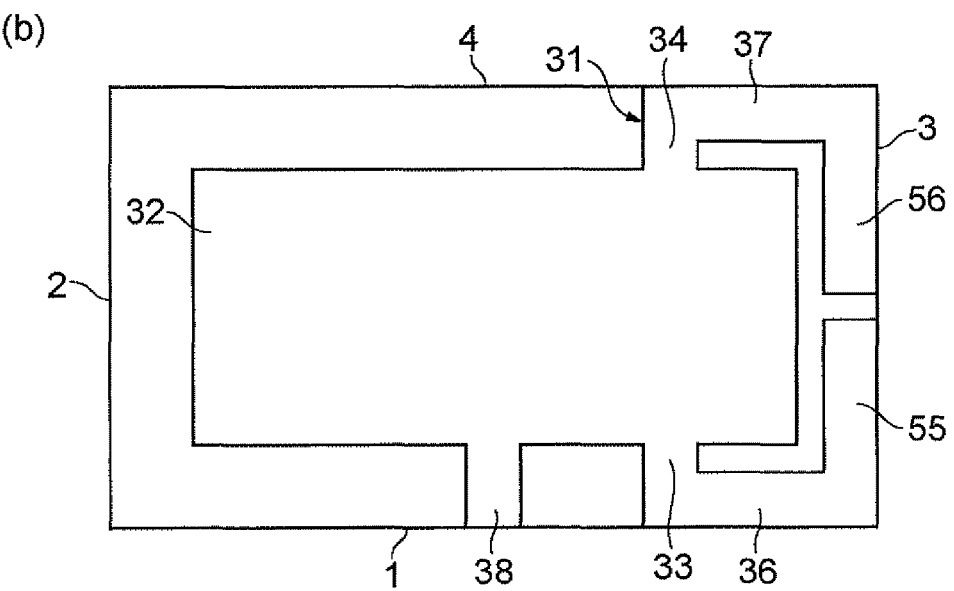

With reference to FIG. 6, another variation of the first embodiment will be described. FIG. 6 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 6, the shapes of the first and second inner electrodes 21 and 31 of the multilayer capacitor of this variation are different from those of the first embodiment.

The first inner electrode 21 has a main electrode 22, coupling conductors 23 and 24, and lead conductors 26 to 28, which are included in the first inner electrode 21 of the first embodiment. The first inner electrode 21 has two lead conductors 53 and 54 instead of the lead conductor 25, which are included in the first inner electrode 21 of the first embodiment. The lead conductors 53 and 54 extend along the side face 2 of the body E1 so as to define a gap between theses leads and the main electrode 22. One end of the lead conductor 53 is connected to the lead conductor 26, and one end of the lead conductor 54 is connected to the lead conductor 27. A gap is provided between the other ends of the lead conductors 53 and 54. In the lead conductors 53 and 54, each of their edges adjacent to the side face 2 is exposed from the side face 2 to be electrically and physically connected to the first terminal electrode 10.

The second inner electrode 31 has a main electrode 32, coupling conductors 33 and 34, and lead conductors 36 to 38, which are included in the second inner electrode 31 of the first embodiment. The second inner electrode 31 has two lead conductors 55 and 56 instead of the lead conductor 35, which are included in the second inner electrode 31 of the first embodiment. The lead conductors 55 and 56 extend along the side face 3 of the body E1 so as to define a gap between theses leads and the main electrode 32. One end of the lead conductor 55 is connected to the lead conductor 36, and one end of the lead conductor 56 is connected to the lead conductor 37. A gap is provided between the other ends of the lead conductors 55 and 56. In the lead conductors 55 and 56, each of their edges adjacent to the side face 3 is exposed from the side face 3 to be electrically and physically connected to the second terminal electrode 12.

In the multilayer capacitor, the lead conductors 54 and 56, respectively, are not directly connected to the lead conductors 53 and 55, but currents also flow into the lead conductors 54 and 56 through the first and second terminal electrodes 10 and 12 when the multilayer capacitor C1 is disposed on a mounting substrate such that the side face 1 faces the mounting substrate. In such a multilayer capacitor, partial narrow current paths are also formed in the first and second inner electrodes 21 and 31, and the third and fourth inner electrodes 41 and 45 are indirectly connected to the first and second terminal electrodes 10 and 12, which can increase its ESR.

Figure 7:
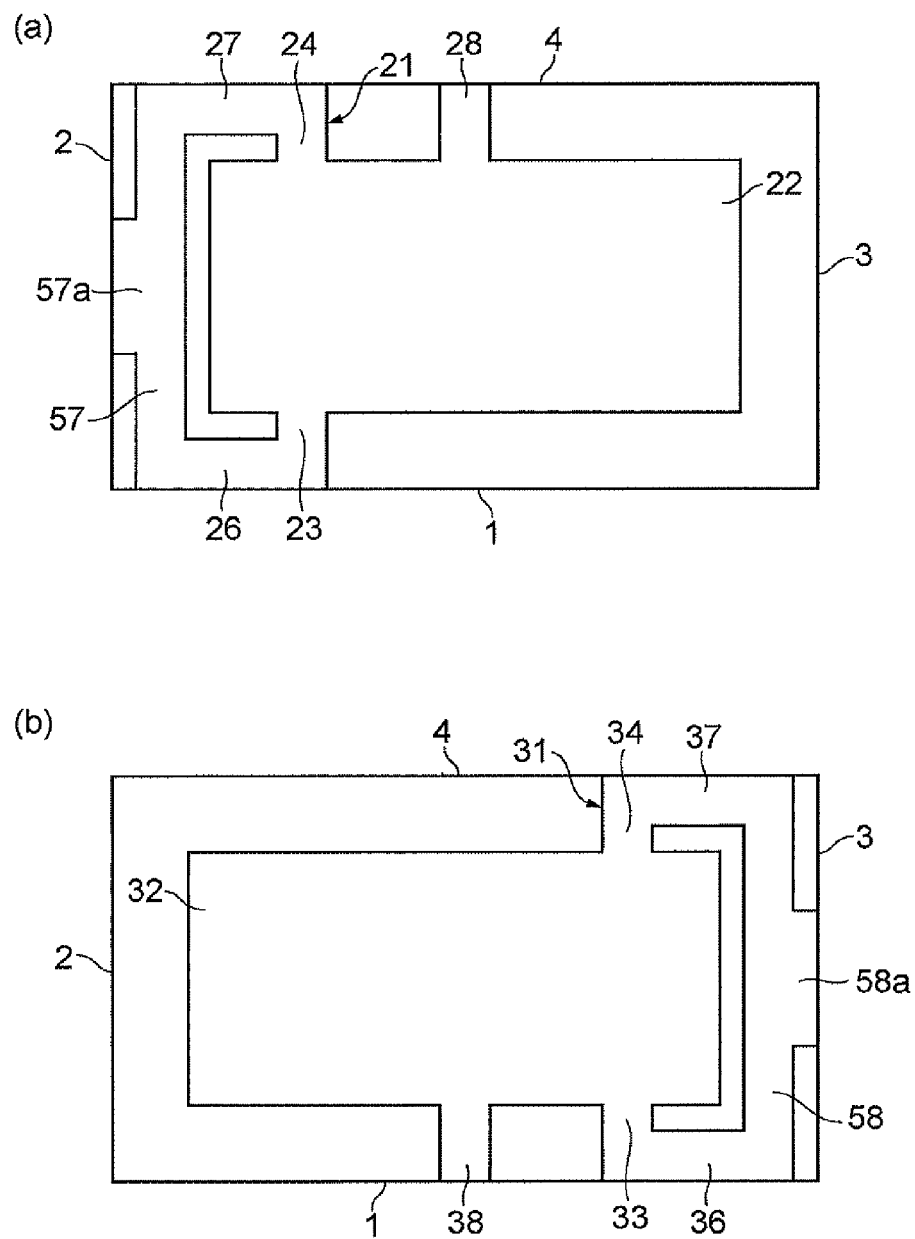
FIG. 7 shows the structures of inner electrodes of multilayer capacitor in another variation of the first embodiment.

With reference to FIG. 7, another variation of the first embodiment will be described. FIG. 7 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 7, the shapes of the first and second inner electrodes 21 and 31 of the multilayer capacitor of this variation are different from those of the first embodiment.

The first inner electrode 21 has a main electrode 22, coupling conductors 23 and 24, and lead conductors 26 to 28, which are included in the first inner electrode 21 of the first embodiment. The first inner electrode 21 has a lead conductor 57 instead of the lead conductor 25, which are included in the first inner electrode 21 of the first embodiment. The lead conductor 57 extends along the side face 2 of the body E1 so as to define a gap between the lead conductor 57 and the main electrode 22. One end of the lead conductor 57 is connected to the lead conductor 26, and the other end of the lead conductor 57 is connected to the lead conductor 27. The lead conductor 57 includes a conductor 57*a* extending toward the side face 2 between one end and the other end of the lead conductor 57, and only the edge of the conductor 57*a* is exposed from the side face 2.

The second inner electrode 31 has a main electrode 32, coupling conductors 33 and 34, and lead conductors 36 to 38, which are included in the second inner electrode 31 of the first embodiment. The second inner electrode 31 has a lead conductor 58 instead of the lead conductor 35, which is included in the second inner electrode 31 of the first embodiment. The lead conductor 58 extends along the side face 3 of the body E1 so as to define a gap between the lead conductor 58 and the main electrode 32. One end of the lead conductor 58 is connected to the lead conductor 36, and the other end of the lead conductor 58 is connected to the lead conductor 37. The lead conductor 58 includes a conductor 58*a* extending toward the side face 3 between one end and the other end of the lead conductor 58, and only the edge of the conductor 58*a* is exposed from the side face 3.

In the multilayer capacitor of this variation, partial narrow current paths are also formed in the first and second inner electrodes 21 and 31, and the third and fourth inner electrodes 41 and 45 are indirectly connected to the first and second terminal electrodes 10 and 12, thereby increasing its ESR.

Figure 8:
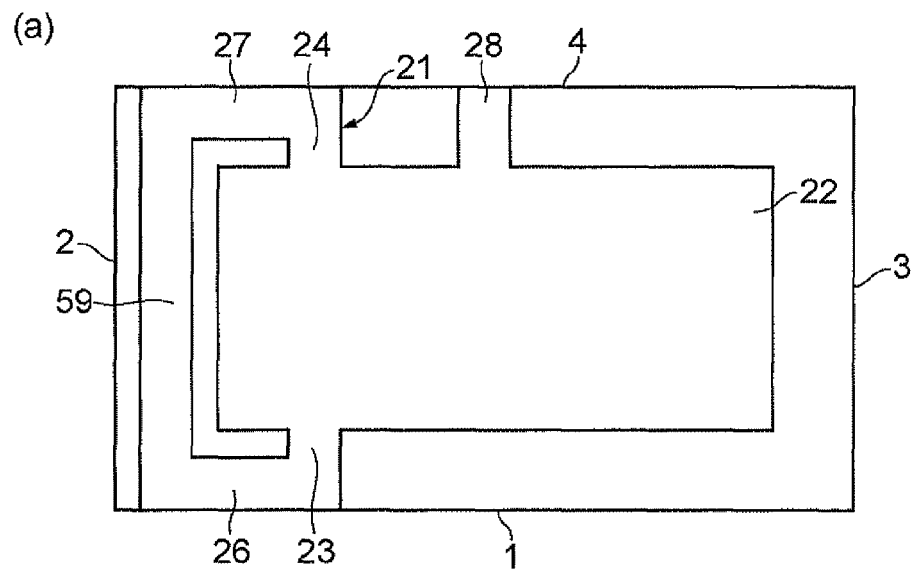
FIG. 8 shows the structures of inner electrodes of multilayer capacitor in another variation of the first embodiment.
Figure 8:
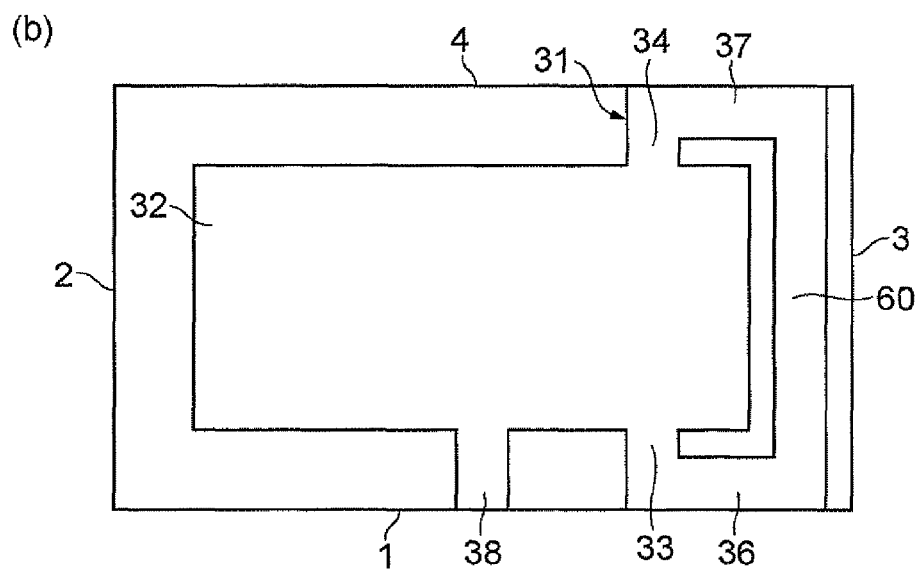

With reference to FIG. 8, another variation of the first embodiment will be described. FIG. 8 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 8, the shapes of the first and second inner electrodes 21 and 31 of the multilayer capacitor of this variation are different from those of the first embodiment.

The first inner electrode 21 has a main electrode 22, coupling conductors 23 and 24, and lead conductors 26 to 28, which are included in the first inner electrode 21 of the first embodiment. The first inner electrode 21 has a lead conductor 59 instead of the lead conductor 25, which is included in the first inner electrode 21 of the first embodiment. One end of the lead conductor 59 is connected to the lead conductor 26, and the other end of the lead conductor 59 is connected to the lead conductor 27. The lead conductor 59 extends along the side face 2 of the body E1 so as to define a gap between the main electrode 22 and the lead conductor 59, which is not exposed from the side face 2.

The second inner electrode 31 has a main electrode 32, coupling conductors 33 and 34, and lead conductors 36 to 38, which are included in the second inner electrode 31 of the first embodiment. The second inner electrode 31 has a lead conductor 60 instead of the lead conductor 35, which is included in the second inner electrode 31 of the first embodiment. One end of the lead conductor 60 is connected to the lead conductor 36, and the other end of the lead conductor 60 is connected to the lead conductor 37. The lead conductor 60 extends along the side face 3 of the body E1 so as to define a gap between the main electrode 32 and the lead conductor 60, which is not exposed from the side face 3.

In the multilayer capacitor of this variation, partial narrow current paths are also formed in the first and second inner electrodes 21 and 31, and the third and fourth inner electrodes 41 and 45 are indirectly connected to the first and second terminal electrodes 10 and 12, thereby increasing its ESR.

Figure 9:
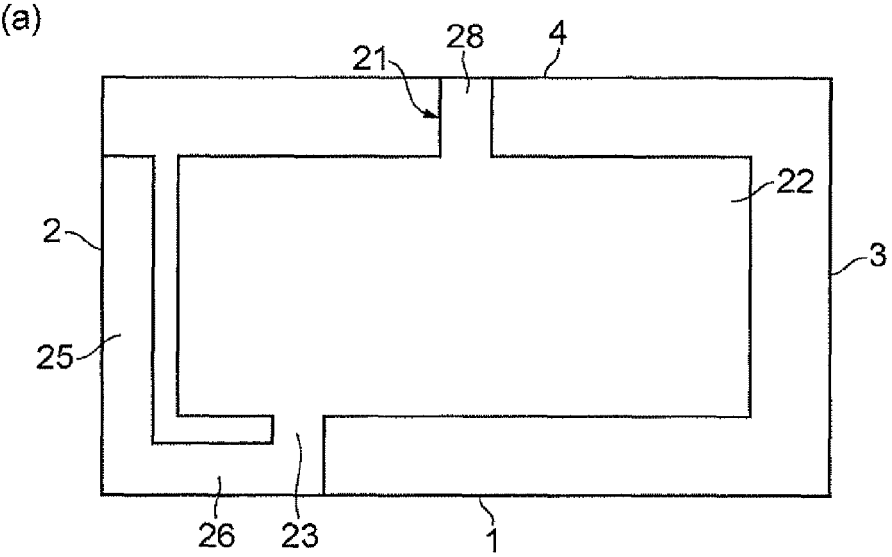
FIG. 9 shows the structures of inner electrodes of multilayer capacitor in another variation of the first embodiment.
Figure 9:
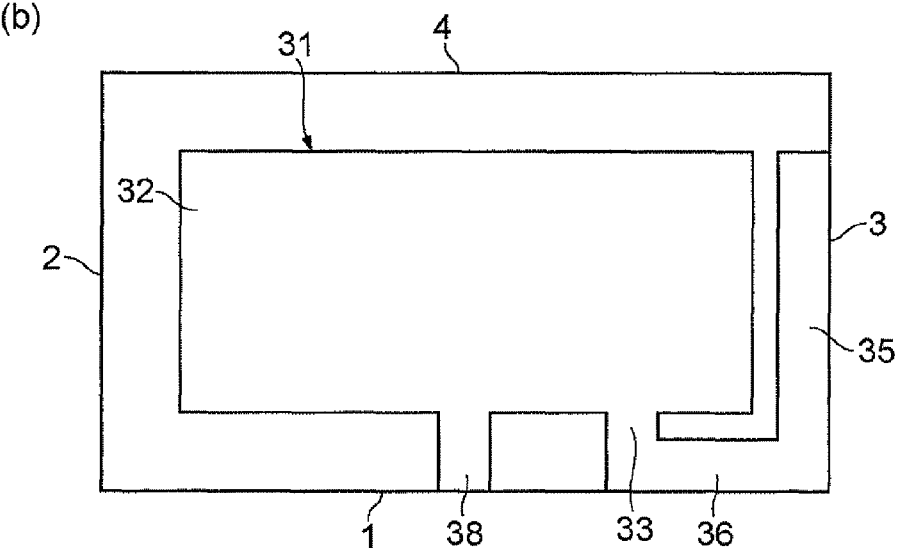

With reference to FIG. 9, another variation of the first embodiment will be described. FIG. 9 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 9, the shapes of the first and second inner electrodes 21 and 31 of the multilayer capacitor of this variation are different from those of the first embodiment.

The first inner electrode 21 has a main electrode 22, a coupling conductor 23, and lead conductors 25, 26, and 28, which are included in the first inner electrode 21 of the first embodiment, but does not include a coupling conductor 24 and a lead conductor 27 included in the first inner electrode 21 of the first embodiment. The second inner electrode 31 has a main electrode 32, a coupling conductor 33, and lead conductors 35, 36, and 38, which are included in the second inner electrode 31 of the first embodiment, but does not include a coupling conductor 34 and a lead conductor 37 included in the second inner electrode 31 of the first embodiment.

In such a multilayer capacitor, partial narrow current paths are also formed in the first and second inner electrodes 21 and 31, and the third and fourth inner electrodes 41 and 45 are indirectly connected to the first and second terminal electrodes 10 and 12, thereby increasing its ESR. A single current path is formed from the first terminal electrode 10 to the main electrode 22, while another single current path from the second terminal electrode 12 to the main electrode 32, thereby providing a higher ESR.

Figure 10:
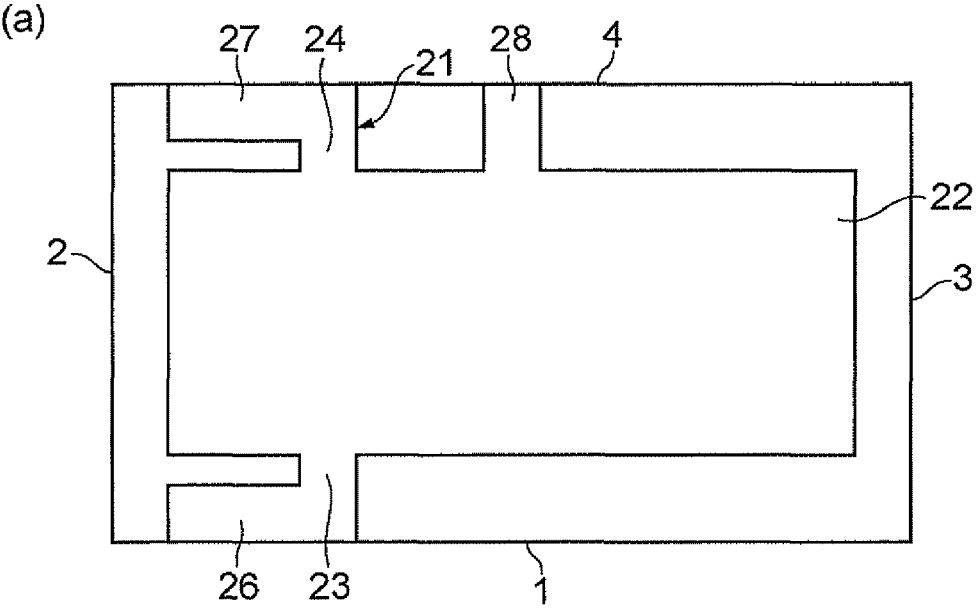
FIG. 10 shows the structures of inner electrodes of multilayer capacitor in another variation of the first embodiment.
Figure 10:
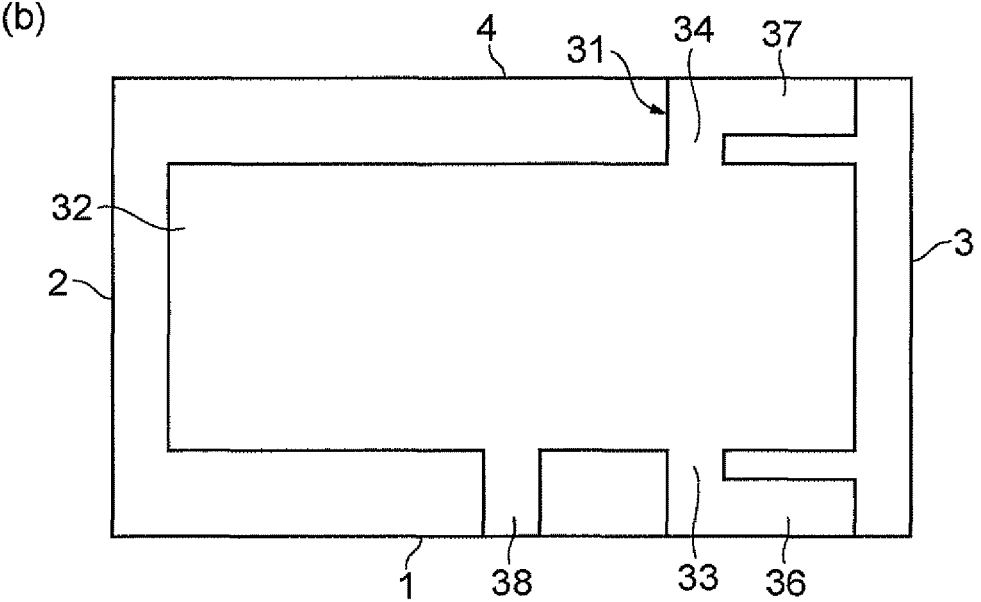

With reference to FIG. 10, another variation of the first embodiment will be described. FIG. 10 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 10, the shapes of the first and second inner electrodes 21 and 31 of the multilayer capacitor of this variation are different from those of the first embodiment.

The first inner electrode 21 has a main electrode 22, coupling conductors 23 and 24, and lead conductors 26 to 28, which are included in the first inner electrode 21 of the first embodiment, but does not include a lead conductor 25 included in the first inner electrode 21 of the first embodiment. The second inner electrode 31 has a main electrode 32, coupling conductors 33 and 34, and lead conductors 36 to 38, which are included in the second inner electrode 31 of the first embodiment, but does not include a coupling conductor 34 and a lead conductor 35 included in the second inner electrode 31.

In the multilayer capacitor, the lead conductors 27 and 37, respectively, are not directly connected to the lead conductors 26 and 36, but currents also flow into the lead conductors 26, 27, 36 and 37 through the first and second terminal electrodes 10 and 12 when the multilayer capacitor C1 is disposed on a mounting substrate such that the side face 1 faces the mounting substrate. In the multilayer capacitor of this variation, partial narrow current paths are also formed in the first and second inner electrodes 21 and 31, and the third and fourth inner electrodes 41 and 45 are indirectly connected to the first and second terminal electrodes 10 and 12, thereby increasing its ESR.

Figure 11:
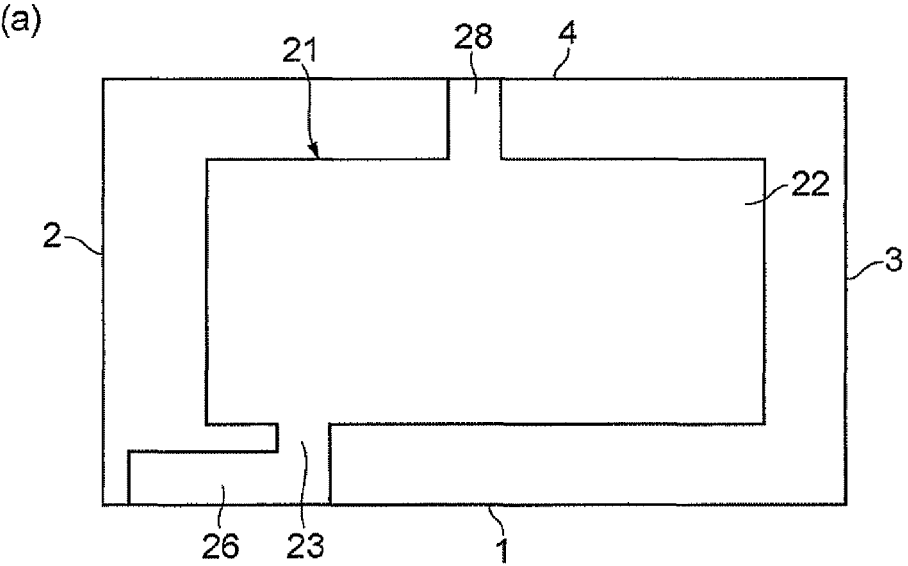
FIG. 11 shows the structures of inner electrodes of multilayer capacitor in another variation of the first embodiment.
Figure 11:
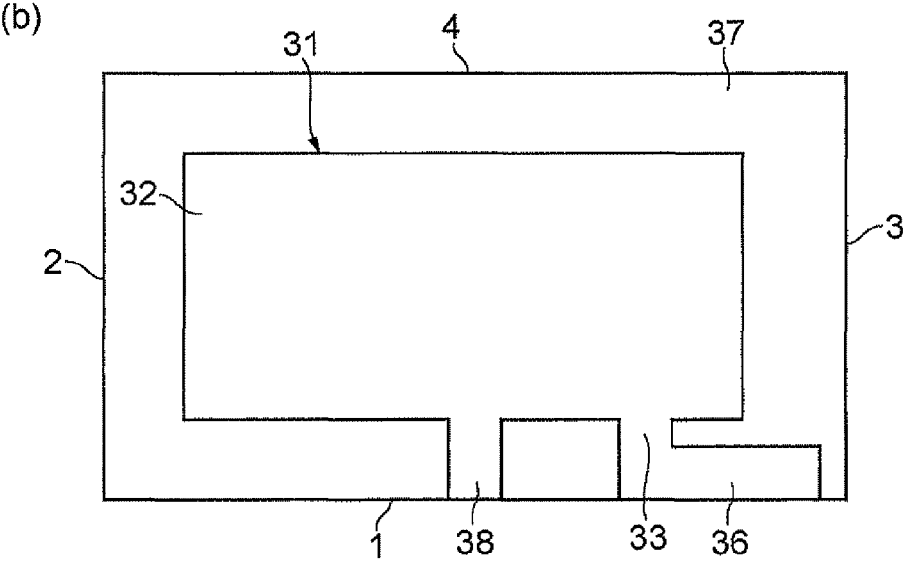

With reference to FIG. 11, another variation of the first embodiment will be described. FIG. 11 shows the structures of inner electrodes of multilayer capacitor based on this variation.

Although not shown in the drawings, the multilayer capacitor includes a body E1, a first inner electrode 21, a second inner electrode 31, a third inner electrode 41, a fourth inner electrode 45, a first terminal electrode 10, a second terminal electrode 12, a first connection conductor 14, and a second connection conductor 16, like the multilayer capacitor C1 of the first embodiment. As shown in FIG. 11, the shapes of the first and second inner electrodes 21 and 31 of the multilayer capacitor of this variation are different from those of the first embodiment.

The first inner electrode 21 has a main electrode 22, a coupling conductor 23, and lead conductors 26 and 28, which are included in the first inner electrode 21 of the first embodiment, but does not include a coupling conductor 24 and lead conductors 25 and 27 included in the first inner electrode 21 of the first embodiment. The second inner electrode 31 has a main electrode 32, a coupling conductor 33, and lead conductors 36 and 38, which are included in the second inner electrode 31 of the first embodiment, but does not include a coupling conductor 34 and lead conductors 35 and 37 included in the second inner electrode 31.

In such a multilayer capacitor, partial narrow current paths are also formed in the first and second inner electrodes 21 and 31, and the third and fourth inner electrodes 41 and 45 are indirectly connected to the first and second terminal electrodes 10 and 12, thereby increasing its ESR. A single current path is formed from the first terminal electrode 10 to the main electrode 22, while another single current path from the second terminal electrode 12 to the main electrode 32, thereby providing a higher ESR.

Second Embodiment

Figure 12:
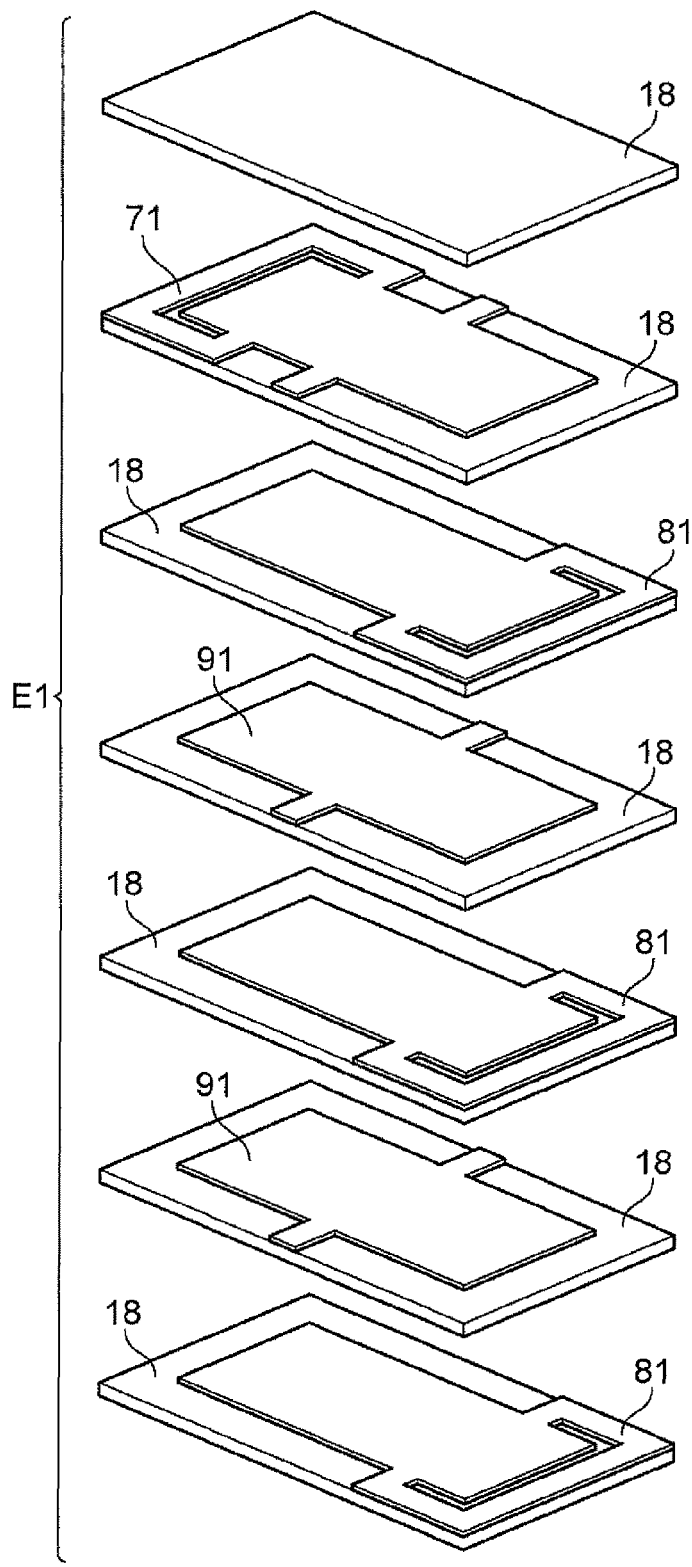
FIG. 12 is a perspective exploded view of the body of a multilayer capacitor in a second embodiment.
Figure 13:
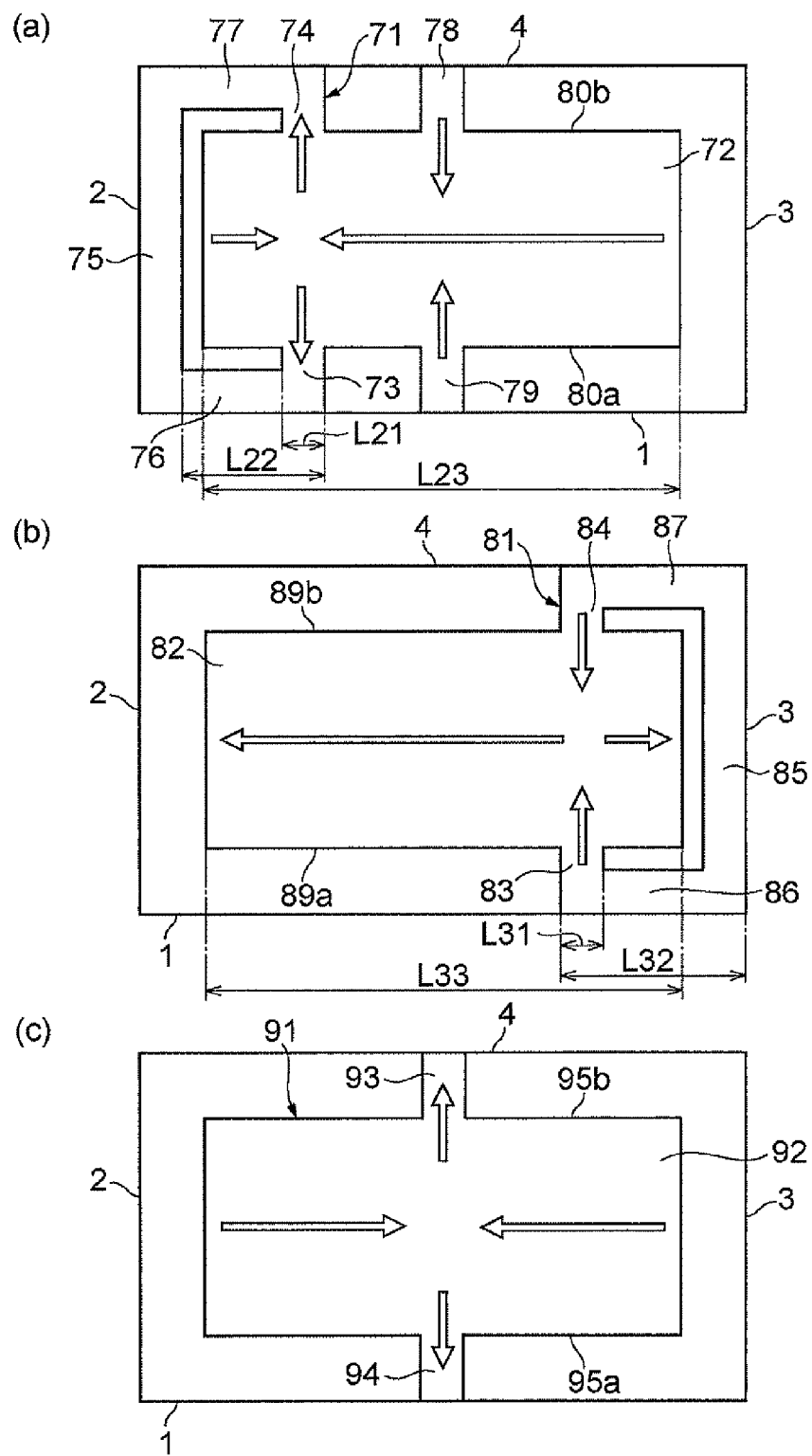
FIG. 13 shows the structures of inner electrodes of the multilayer capacitor in the second embodiment.

FIG. 12 is a perspective exploded view of the body of the multilayer capacitor based on a second embodiment. FIG. 13 shows the structures of inner electrodes of the multilayer capacitor.

Although not shown in the drawings, the multilayer capacitor includes a substantially rectangular solid body E1, a first terminal electrode 10, a second terminal electrode 12, a first connection conductor 14, and a second connection conductor 16, like the multilayer capacitor C1 of the first embodiment. The body E1 has the same layout on the first and second terminal electrodes 10 and 12, and the first and second connection conductors 14 and 16 as the multilayer capacitor C1 of the first embodiment.

The multilayer capacitor of the second embodiment includes a first inner electrode 71, second inner electrodes 81 (three electrodes in this embodiment), and third inner electrodes 91 (two electrodes in this embodiment) in the body E1. In the multilayer capacitor, the first inner electrode 71, the second inner electrode 81, the third inner electrode 91, the second inner electrode 81, the third inner electrode 91, and the second inner electrode 81 are laminated in that order, these layers being separated by insulating layers 18. These inner electrodes are composed of a sinter of a conductive paste.

The first inner electrode 71 and the adjacent second inner electrode 81 sandwich the insulating layer 18. With reference to FIG. 13(a), the first inner electrode 71 has a main electrode 72, coupling conductors 73 and 74, and lead conductors 75 to 79.

The rectangular main electrode 72 has long sides along the long sides of the side faces 5 and 6. The main electrode 72 includes a pair of edges 80a and 80b extending in its longitudinal direction. The edges 80a and 80b are adjacent to the side faces 1 and 4, respectively.

The main electrode 72 includes a region functioning as a capacitor. The region functioning as a capacitor overlaps with a main electrode 82 of the second inner electrode 81 described below, as viewed from the laminating direction of the insulating layers 18. In this embodiment, the main electrode 72 entirely overlaps with the main electrode 82. Therefore, the substantially entire region of the main electrode 72 functions as a capacitor.

The coupling conductor 73 is adjacent to the side face 1 and is connected to the main electrode 72. The coupling conductor 73 extends from the edge 80a of the main electrode 72 toward the side face 1 of the body E1.

The lead conductor 76 has an end connected to the coupling conductor 73, and extends toward the side face 2 along the side face 1 of the body E1 so as to define a gap between the lead conductor 76 and the main electrode 72. In the lead conductor 76, its edge adjacent to the side face 1 is exposed from the side face 1 to be electrically and physically connected to the first terminal electrode 10. In the extending direction of the lead conductor 76, the coupling conductor 73 has a length L21 shorter than the length L22 of the lead conductor 76 and the length L23 of the main electrode 72.

The coupling conductor 74 is adjacent to the side face 4 and is connected to the main electrode 72. The coupling conductor 74 extends from the edge 80b of the main electrode 72 toward the side face 4 of the body E1.

The lead conductor 77 has an end connected to the coupling conductor 74, and extends toward the side face 2 along the side face 4 of the body E1 so as to define a gap between the lead conductor 77 and the main electrode 72. In the lead conductor 77, its edge adjacent to the side face 4 is exposed from the side face 4 to be electrically and physically connected to the first terminal electrode 10. In the extending direction of the lead conductor 77, the coupling conductor 74 has a length shorter than the lengths of the lead conductor 77 and of the main electrode 72.

The lead conductor 75 is connected to both the lead conductors 76 and 77. More specifically, one end of the lead conductor 75 is connected to the lead conductor 76, and the other end of the lead conductor 75 is connected to the lead conductor 77. The lead conductor 75 extends along the side face 2 of the body E1 so as to define a gap between the lead conductor 75 and the main electrode 72. In the lead conductor 75, its edge adjacent to the side face 2 is exposed from the side face 2 to be electrically and physically connected to the first terminal electrode 10.

The lead conductor 78 extends from the main electrode 72 to the side face 4. One end of the lead conductor 78 is connected to the main electrode 72, and the other end of the lead conductor 78 is exposed from the side face 4 to be electrically and physically connected to the first connection conductor 14. The lead conductor 78 extends from the edge 80b of the main electrode 72 toward the side face 4 of the body E1.

The lead conductor 78 is disposed between the coupling conductors 73 and 83 and between the coupling conductors 74 and 84, as viewed from the direction perpendicular to the side faces 1 and 4.

The lead conductor 79 extends from the main electrode 72 to the side face 1. One end of the lead conductor 79 is connected to the main electrode 72, and the other end of the lead conductor 79 is exposed from the side face 1 to be electrically and physically connected to the second connection conductor 16. The lead conductor 79 extends from the edge 80a of the main electrode 72 toward the side face 1 of the body E1. The lead conductor 79 is disposed between the coupling conductors 73 and 83 and between the coupling conductors 74 and 84, as viewed from the direction perpendicular to the side faces 1 and 4 (perpendicular to FIGS. 13(a) and 13(b)).

With reference to FIG. 13(b), the second inner electrode 81 has a main electrode 82, coupling conductors 83 and 84, and lead conductors 85 to 87.

The rectangular main electrode 82 has long sides along the long sides of the side faces 5 and 6. The main electrode 82 includes a pair of edges 89a and 89b extending in its longitudinal direction. The edges 89a and 89b are adjacent to the side faces 1 and 4, respectively.

The main electrode 82 includes a region functioning as a capacitor. The region functioning as a capacitor overlaps with a main electrode 72 of the first inner electrode 71, as viewed from the laminating direction of the insulating layers 18. In this embodiment, the main electrode 72 entirely overlaps with the main electrode 82. Therefore, the substantially entire region of the main electrode 82 functions as a capacitor.

The coupling conductor 83 is adjacent to the side face 1 and is connected to the main electrode 82. The coupling conductor 83 extends from the edge 89a of the main electrode 82 toward the side face 1 of the body E1.

The lead conductor 86 has an end connected to the coupling conductor 83, and extends toward the side face 3 along the side face 1 of the body E1 so as to define a gap between the lead conductor 86 and the main electrode 82. In the lead conductor 86, its edge adjacent to the side face 1 is exposed from the side face 1 to be electrically and physically connected to the second terminal electrode 12. In the extending direction of the lead conductor 86, the coupling conductor 83 has a length L31 shorter than the length L32 of the lead conductor 86 and the length L33 of the main electrode 82.

The coupling conductor 84 is adjacent to the side face 4 and is connected to the main electrode 82. The coupling conductor 84 extends from the edge 89b of the main electrode 82 toward the side face 4 of the body E1.

The lead conductor 87 has an end connected to the coupling conductor 84, and extends toward the side face 3 along the side face 4 of the body E1 so as to define a gap between the lead conductor 87 and the main electrode 82. In the lead conductor 87, its edge adjacent to the side face 4 is exposed from the side face 4 to be electrically and physically connected to the second terminal electrode 12. In the extending direction of the lead conductor 87, the coupling conductor 84 has a length shorter than the lengths of the lead conductor 87 and of the main electrode 82.

The lead conductor 85 is connected to both the lead conductors 86 and 87. More specifically, one end of the lead conductor 85 is connected to the lead conductor 86, and the other end of the lead conductor 85 is connected to the lead conductor 87. The lead conductor 85 extends along the side face 3 of the body E1 so as to define a gap between the lead conductor 85 and the main electrode 82. In the lead conductor 85, its edge adjacent to the side face 3 is exposed from the side face 3 to be electrically and physically connected to the second terminal electrode 12.

with reference to FIG. 13(c), the third inner electrode 91 has a main electrode 92 and lead conductors 93 and 94.

The rectangular main electrode 92 has long sides along the long sides of the side faces 5 and 6. The main electrode 92 includes a pair of edges 95a and 95b extending in its longitudinal direction. The edges 95a and 95b are adjacent to the side faces 1 and 4, respectively. The main electrode 92 includes a region functioning as a capacitor. The region functioning as a capacitor overlaps with the main electrode 72 of the first inner electrode 71 and the main electrode 82 of the second inner electrode 81, as viewed from the laminating direction of the insulating layers 18. In this embodiment, the main electrode 92 entirely overlaps with the main electrodes 72 and 82. Therefore, the substantially entire region of the main electrode 92 functions as a capacitor.

The lead conductor 93 extends from the main electrode 92 to the side face 4. One end of the lead conductor 93 is connected to the main electrode 92, and the other end of the lead conductor 93 is exposed from the side face 4 to be electrically and physically connected to the first connection conductor 14. The lead conductor 93 extends from the edge 95b of the main electrode 92 toward the side face 4 of the body E1. The lead conductor 93 is disposed between the coupling conductors 73 and 83 and between the coupling conductors 74 and 84, as viewed from the direction perpendicular to the side faces 1 and 4 (perpendicular to FIGS. 13(a) to 13(c)).

The lead conductor 94 extends from the main electrode 92 to the side face 1. One end of the lead conductor 94 is connected to the main electrode 92, and the other end of the lead conductor 94 is exposed from the side face 1 to be electrically and physically connected to the second connection conductor 16. The lead conductor 94 extends from the edge 95a of the main electrode 92 toward the side face 1 of the body E1. The lead conductor 94 is disposed between the coupling conductors 73 and 83 and between the coupling conductors 74 and 84, as viewed from the direction perpendicular to the side faces 1 and 4.

In the multilayer capacitor of this embodiment having the structure described above, the coupling conductors 73 and 83 connect the lead conductors 76 and 86 to the main electrodes 72 and 82 in the first and second inner electrodes 71 and 81, respectively. In the extending direction of the lead conductor 76, the coupling conductor 73 has a length shorter than the lengths of the lead conductor 76 and of the main electrode 72. In the extending direction of the lead conductor 86, the coupling conductor 83 has a length shorter than the lengths of the lead conductor 86 and of the main electrode 82. In other words, paths between the lead conductor 76 and the main electrode 72 and between the lead conductor 86 and the main electrode 82 are narrow. Accordingly, in the multilayer capacitor of this embodiment, partial narrow current paths formed in the first and second inner electrodes 71 and 81 increase its ESR.

The first inner electrode 71 is connected to the first terminal electrode 10 and the first and second connection conductors 14 and 16. The third inner electrode 91 is not connected to the first terminal electrode 10, but is connected to only the first and second connection conductors 14 and 16. In other words, the third inner electrode 91 is indirectly connected to the first terminal electrode 10 through the first inner electrode 71. This indirect connection of the inner electrodes to the first terminal electrode 10 ensures higher ESR of the multilayer capacitor of this embodiment.

The main electrodes 72 and 82 are adjacent to each other so as to sandwich the insulating layer 18. The main electrodes 72 and 82 connected to different terminal electrodes form a capacitance component during applying a voltage. Therefore, the multilayer capacitor of this embodiment surely can have capacitance.

The main electrodes 82 and 92 are adjacent to each other so as to sandwich the insulating layer 18. The main electrodes 82 and 92 connected to different terminal electrodes form a capacitance component during applying a voltage. Therefore, the multilayer capacitor of this embodiment surely can have higher capacitance.

The coupling conductor 73 is connected to the edge 80a of the main electrode 72, and extends toward the side face 1 of the body E1. The coupling conductor 83 is connected to the edge 89a of the main electrode 82, and extends toward the side face 1 of the body E1. Therefore, the coupling conductors 73 and 83 are parallel to and close to each other, as viewed from the laminating direction. The coupling conductor 73 is connected to the first terminal electrode 10, while the coupling conductor 83 is connected to the second terminal electrode 12 having a different polarity from that of the first terminal electrode 10. Therefore, countercurrents flow in the coupling conductors 73 and 83 during applying a voltage to the multilayer capacitor, which can partially cancel magnetic fields caused by these countercurrents. Therefore, the multilayer capacitor of this embodiment can also have a reduced ESL. Arrows in FIG. 13 indicate directions of currents when the first terminal electrode 10 is used as a cathode and the second terminal electrode 12 as an anode.

Third Embodiment

Figure 14:
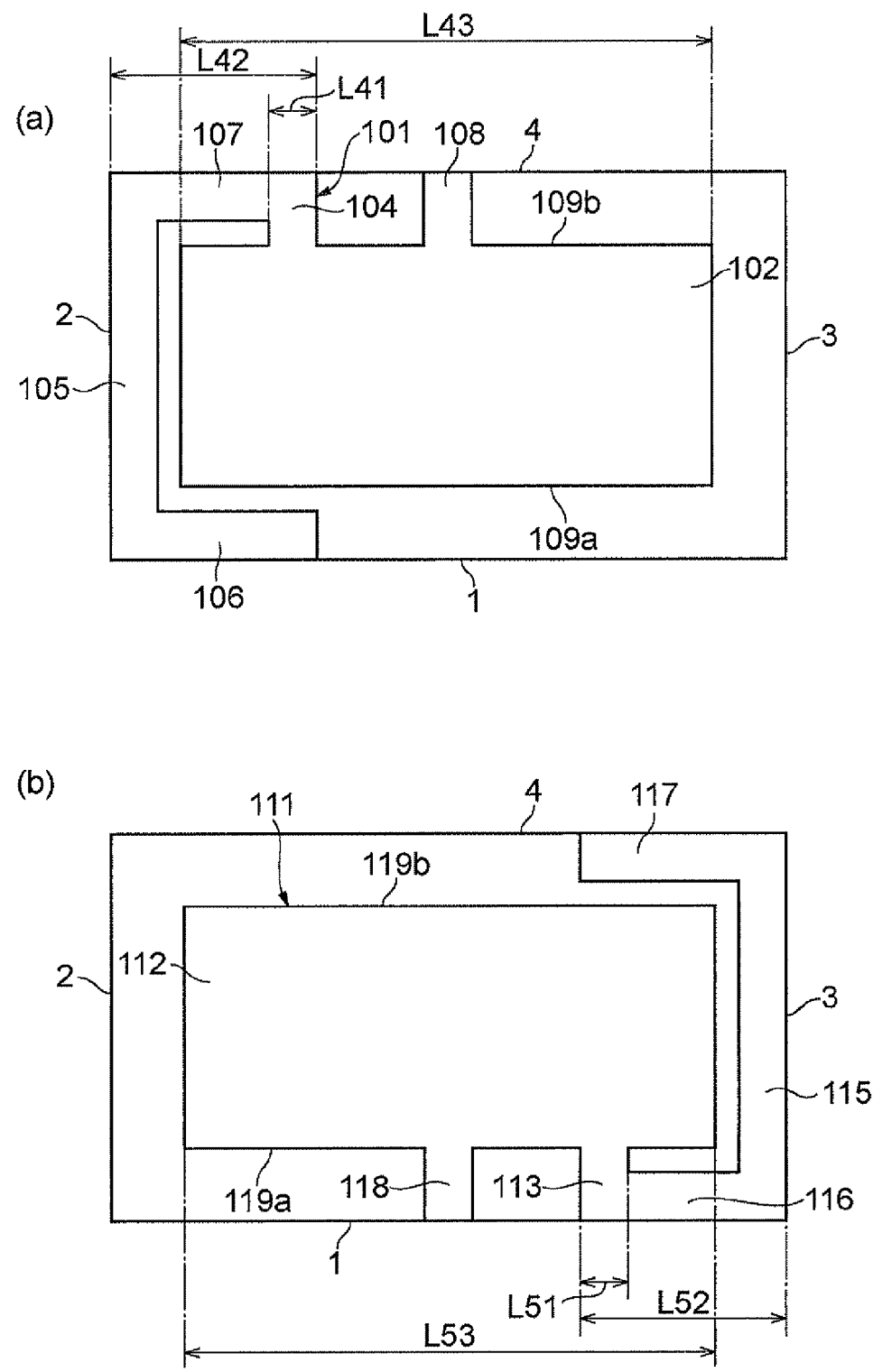
FIG. 14 shows the structures of inner electrodes of the multilayer capacitor in a third embodiment.

FIG. 14 shows the structures of inner electrodes of the multilayer capacitor based on a third embodiment. Although not shown in the drawings, the multilayer capacitor includes a substantially rectangular solid body E1, a first terminal electrode 10, a second terminal electrode 12, a first connection conductor 14, and a second connection conductor 16, like the multilayer capacitor C1 of the first and second embodiments. The body E1 has the same layout on the first and second terminal electrodes 10 and 12, and the first and second connection conductors 14 and 16 as the multilayer capacitor C1 of the first embodiment.

The body E1 has side faces 1 to 6 as described in the first embodiment. The side face 1 faces the side face 4, the side face 2 faces the side face 3, and the side face 5 faces the side face 6. The side faces 1 and 4 extend in the direction of the long sides of the rectangular side faces 5 and 6 so as to connect the side faces 5 and 6. The side faces 2 and 3 extend in the direction of the short sides of the side faces 5 and 6 so as to connect the side faces 5 and 6. The multilayer capacitor of this embodiment is disposed on a mounting substrate such that the side face 1 faces the mounting substrate.

The multilayer capacitor includes a first inner electrode 101 and a second inner electrode 111 in the body E1 instead of the first and second inner electrodes 21 and 31 of the multilayer capacitor C1 in the first embodiment.

The first inner electrode 101 and the adjacent second inner electrode 111 sandwich the insulating layer 18. With reference to FIG. 14(a), the first inner electrode 101 has a main electrode 102, a coupling conductors 104, and lead conductors 105 to 108.

The rectangular main electrode 102 has long sides along the long sides of the side faces 5 and 6. The main electrode 102 includes a pair of edges 109a and 109b extending in its longitudinal direction. The edges 109a and 109b are adjacent to the side faces 1 and 4, respectively. The main electrode 102 includes a region functioning as a capacitor. The region functioning as a capacitor overlaps with a main electrode 112 of the second inner electrode 111 described below. In this embodiment, the main electrode 102 entirely overlaps with the main electrodes 42, 46, and 112. Therefore, the substantially entire region of the main electrode 102 functions as a capacitor. The main electrode 42 of the third inner electrode 41 and the main electrode 46 of the fourth inner electrode 45 overlap with the main electrode 102 of the first inner electrode 101 and the main electrode 112 of the second inner electrode 111, as viewed from the laminating direction of the insulating layers 18.

The coupling conductor 104 is adjacent to the side face 4 and is connected to the main electrode 102. The coupling conductor 104 extends from the edge 109b of the main electrode 102 toward the side face 4 of the body E1.

The lead conductor 107 has an end connected to the coupling conductor 104, and extends toward the side face 2 along the side face 4 of the body E1 so as to define a gap between the lead conductor 107 and the main electrode 102. In the lead conductor 107, its edge adjacent to the side face 4 is exposed from the side face 4 to be electrically and physically connected to the first terminal electrode 10. In the extending direction of the lead conductor 107, the coupling conductor 104 has a length L41 shorter than the length L42 of the lead conductor 107 and the length L43 of the main electrode 102.

The lead conductor 106 extends from the main electrode 102 to the side face 1. The lead conductor 106 extends toward the side face 2 along the side face 1 of the body E1 so as to define a gap between the lead conductor 106 and the main electrode 102. In the lead conductor 106, its edge adjacent to the side face 1 is exposed from the side face 1 to be electrically and physically connected to the first terminal electrode 10.

The lead conductor 105 is connected to both the lead conductors 106 and 107. More specifically, one end of the lead conductor 105 is connected to the lead conductor 106, and the other end of the lead conductor 105 is connected to the lead conductor 107. The lead conductor 105 extends along the side face 2 of the body E1 so as to define a gap between the lead conductor 105 and the main electrode 102. In the lead conductor 105, its edge adjacent to the side face 2 is exposed from the side face 2 to be electrically and physically connected to the first terminal electrode 10.

The lead conductor 108 extends from the main electrode 102 to the side face 4. One end of the lead conductor 108 is connected to the main electrode 102, and the other end of the lead conductor 108 is exposed from the side face 4 to be electrically and physically connected to the first connection conductor 14. The lead conductor 108 extends from the edge 109b of the main electrode 102 toward the side face 4 of the body E1. The lead conductor 108 is disposed between the coupling conductors 104 and 113, as viewed from the direction perpendicular to the side faces 1 and 4.

With reference to FIG. 14(b), the second inner electrode 111 has a main electrode 112, a coupling conductor 113, and lead conductors 115 to 118.

The rectangular main electrode 112 has long sides along the long sides of the side faces 5 and 6. The main electrode 112 includes a pair of edges 119a and 119b extending in its longitudinal direction. The edges 119a and 119b are adjacent to the side faces 1 and 4, respectively. The main electrode 112 includes a region functioning as a capacitor. The region functioning as a capacitor overlaps with the main electrode 102 of the first inner electrode 101, as viewed from the laminating direction of the insulating layers 18. In this embodiment, the main electrode 102 entirely overlaps with the main electrode 112. Therefore, the substantially entire region of the main electrode 112 functions as a capacitor.

The coupling conductor 113 is adjacent to the side face 1 and is connected to the main electrode 112. The coupling conductor 113 extends from the edge 119a of the main electrode 112 toward the side face 1 of the body E1.

The lead conductor 116 has an end connected to the coupling conductor 113, and extends toward the side face 3 along the side face 1 of the body E1 so as to define a gap between the lead conductor 116 and the main electrode 112. In the lead conductor 116, its edge adjacent to the side face 1 is exposed from the side face 1 to be electrically and physically connected to the second terminal electrode 12. In the extending direction of the lead conductor 116, the coupling conductor 113 has a length L51 shorter than the length L52 of the lead conductor 116 and the length L53 of the main electrode 112.

The lead conductor 117 extends from the main electrode 112 to the side face 4. The lead conductor 117 extends toward the side face 3 along the side face 4 of the body E1 so as to define a gap between the lead conductor 117 and the main electrode 112. In the lead conductor 117, its edge adjacent to the side face 4 is exposed from the side face 4 to be electrically and physically connected to the second terminal electrode 12.

The lead conductor 115 is connected to both the lead conductors 116 and 117. More specifically, one end of the lead conductor 115 is connected to the lead conductor 116, and the other end of the lead conductor 115 is connected to the lead conductor 117. The lead conductor 115 extends along the side face 3 of the body E1 so as to define a gap between the lead conductor 115 and the main electrode 112. In the lead conductor 115, its edge adjacent to the side face 3 is exposed from the side face 3 to be electrically and physically connected to the second terminal electrode 12.

The lead conductor 118 extends from the main electrode 112 to the side face 1. One end of the lead conductor 118 is connected to the main electrode 112, and the other end of the lead conductor 118 is exposed from the side face 1 to be electrically and physically connected to the second connection conductor 16. The lead conductor 118 extends from the edge 119a of the main electrode 112 toward the side face 1 of the body E1. The lead conductor 118 is disposed between the coupling conductors 104 and 113, as viewed from the direction perpendicular to the side faces 1 and 4 (perpendicular to FIGS. 14(a) and 14(b)).

In the multilayer capacitor of this embodiment having the structure described above, the coupling conductors 104 and 113 connect the lead conductors 107 and 116 to the main electrodes 102 and 112 in the first and second inner electrodes 101 and 111, respectively. In the extending direction of the lead conductor 107, the coupling conductor 104 has a length shorter than the lengths of the lead conductor 107 and of the main electrode 102. In the extending direction of the lead conductor 116, the coupling conductor 113 has a length shorter than the lengths of the lead conductor 116 and of the main electrode 112. In other words, paths between the lead conductor 107 and the main electrode 102 and between the lead conductor 116 and the main electrode 112 are narrow. Accordingly, in the multilayer capacitor of this embodiment, partial narrow current paths formed in the first and second inner electrodes 101 and 111 increase its ESR.

The first inner electrode 101 is connected to the first terminal electrode 10 and the first connection conductor 14. The third inner electrode 41 is not connected to the first terminal electrode 10, but is connected to only the first connection conductor 14. In other words, the third inner electrode 41 is indirectly connected to the first terminal electrode 10 through the first inner electrode 101. This indirect connection of the inner electrodes to the first terminal electrode 10 ensures higher ESR of the multilayer capacitor of this embodiment.

The second inner electrode 111 is connected to the second terminal electrode 12 and the second connection conductor 16. The fourth inner electrode 45 is not connected to the second terminal electrode 12, but is connected to only the second connection conductor 16. In other words, the fourth inner electrode 45 is indirectly connected to the second terminal electrode 12 through the second inner electrode 111. This indirect connection of the inner electrodes to the second terminal electrode 12 ensures higher ESR of the multilayer capacitor of this embodiment.

The main electrodes 102 and 112 are adjacent to each other so as to sandwich the insulating layer 18. The main electrodes 102 and 112 connected to different terminal electrodes form a capacitance component during applying a voltage. Therefore, the multilayer capacitor of this embodiment surely can have capacitance.

Figure 15:
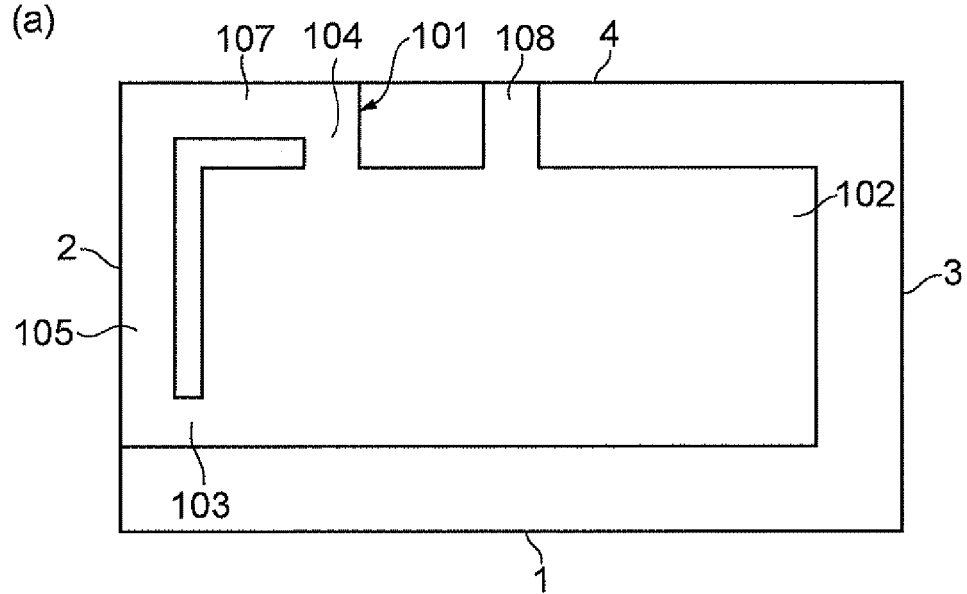
FIG. 15 shows the structures of inner electrodes of multilayer capacitor in a variation of the third embodiment.
Figure 15:
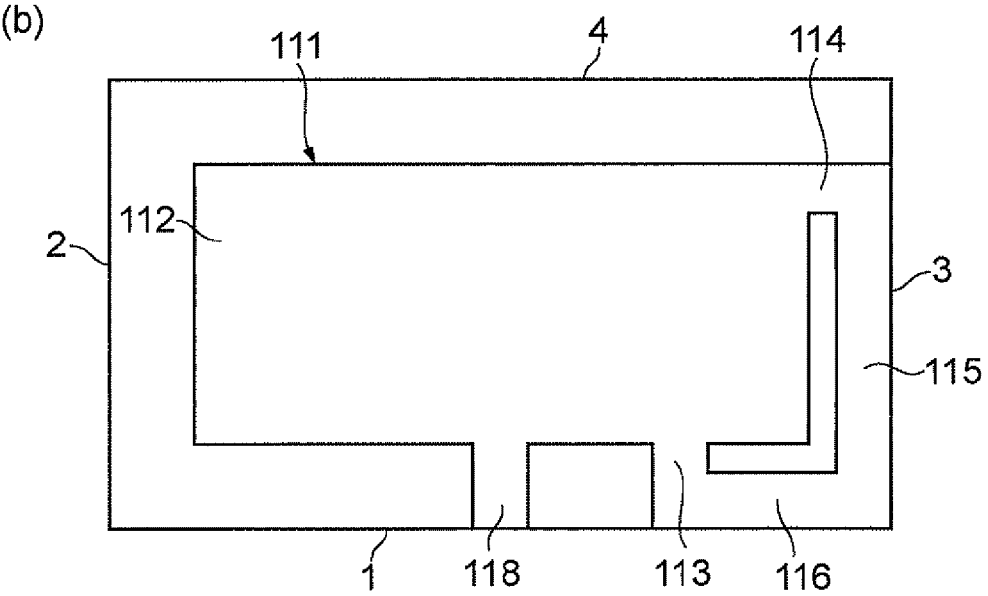

With reference to FIG. 15, a variation of the third embodiment will be described. FIG. 15 shows the structures of inner electrodes of multilayer capacitor based on this variation.

Although not shown in the drawings, the multilayer capacitor includes a body E1, a first inner electrode 101, a second inner electrode 111, a third inner electrode 41, a fourth inner electrode 45, a first terminal electrode 10, a second terminal electrode 12, a first connection conductor 14, and a second connection conductor 16, like the multilayer capacitor of the third embodiment. As shown in FIG. 15, the shapes of the first and second inner electrodes 101 and 111 of the multilayer capacitor of this variation are different from those of the third embodiment.

The first inner electrode 101 has a main electrode 102, a coupling conductor 104, and lead conductors 105 and 107, which are included in the first inner electrode 101 of the third embodiment, but does not include a lead conductor 106 included in the first inner electrode 101. The first inner electrode 101 has a coupling conductor 103. The coupling conductor 103 is adjacent to the side face 2 and is connected to the main electrode 102. The coupling conductor 103 extends from the main electrode 102 toward the side face 2 of the body E1, and is connected to the lead conductor 105.

The second inner electrode 111 has a main electrode 112, a coupling conductor 113, and lead conductors 116 and 118, which are included in the second inner electrode 111 of the third embodiment, but does not include a lead conductor 117 included in the second inner electrode 111. The second inner electrode 111 has a coupling conductor 114. The coupling conductor 114 is adjacent to the side face 3 and is connected to the main electrode 112. The coupling conductor 114 extends from the main electrode 112 toward the side face 3 of the body E1, and is connected to the lead conductor 115.

In the multilayer capacitor of this variation, partial narrow current paths are also formed in the first and second inner electrodes 101 and 111, and the third and fourth inner electrodes 41 and 45 are indirectly connected to the first and second terminal electrodes 10 and 12, thereby increasing its ESR.

Fourth Embodiment

Figure 16:
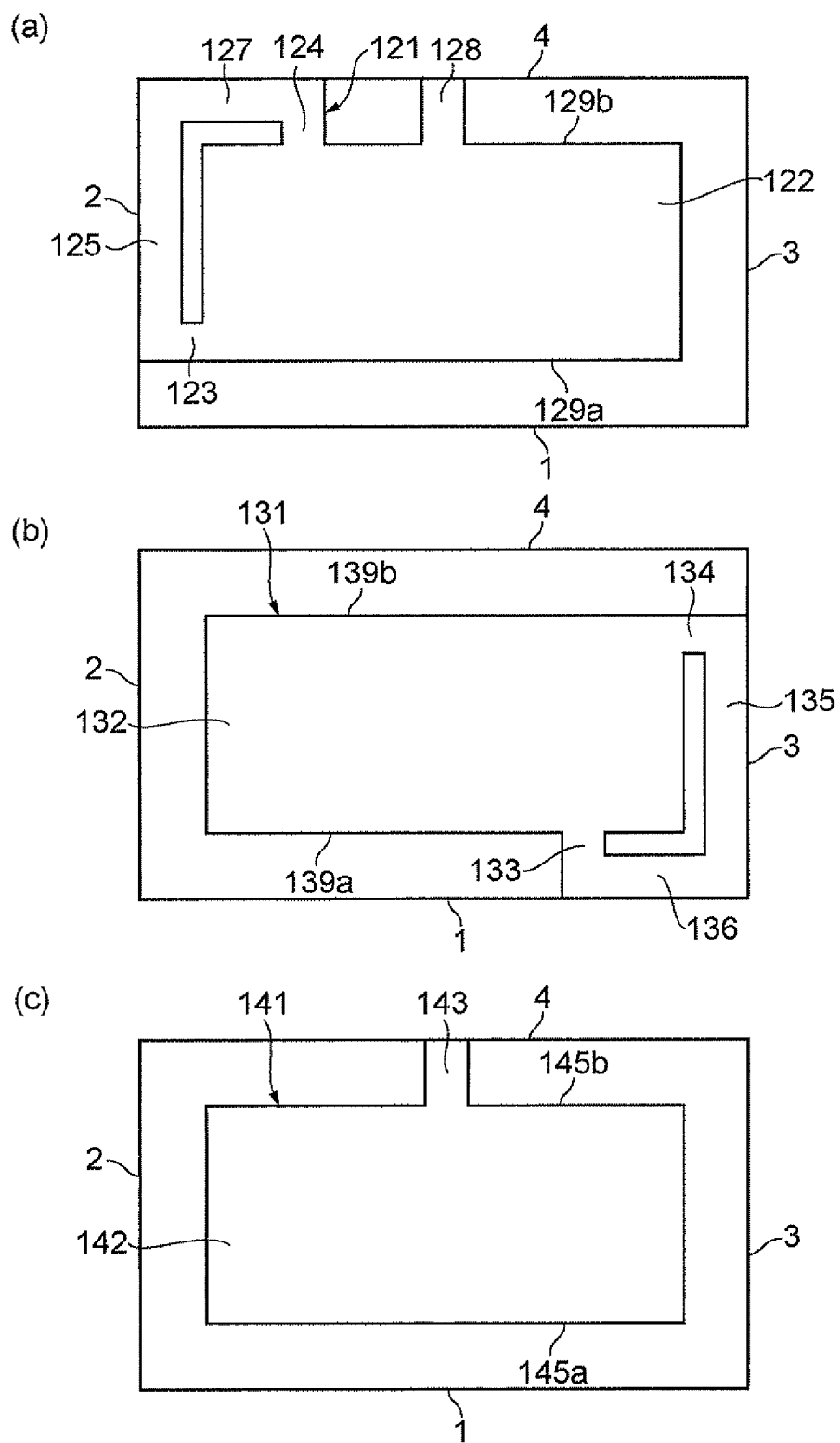
FIG. 16 shows the structures of inner electrodes of the multilayer capacitor in a fourth embodiment.

FIG. 16 shows the structures of inner electrodes of the multilayer capacitor based on a fourth embodiment. Although not shown in the drawings, the multilayer capacitor includes a substantially rectangular solid body E1, a first terminal electrode 10, a second terminal electrode 12, and a first connection conductor 14, like the multilayer capacitor of the first to third embodiments. However, the multilayer capacitor does not include a second connection conductor 16 included in the multilayer capacitor of the first to third embodiments.

The multilayer capacitor has a similar structure to that of the multilayer capacitor in the second embodiment, but the shapes of a first inner electrode, a second inner electrode, and a third inner electrode are different from those of the multilayer capacitor in the second embodiment. The multilayer capacitor includes a first inner electrode 121, a second inner electrode 131, and a third inner electrode 141 in the body E1 instead of the first to third inner electrodes 71, 81, and 91 of the multilayer capacitor in the second embodiment. The first to third inner electrodes 121, 131, and 141 are disposed in the same manner as the first to third inner electrodes 71, 81, and 91 of the multilayer capacitor in the second embodiment.

The first inner electrode 121 and the adjacent second inner electrode 131 sandwich the insulating layer 18. With reference to FIG. 16(*a*), the first inner electrode 121 has a main electrode 122, coupling conductors 123 and 124, and lead conductors 125, 127, and 128.

The rectangular main electrode 112 has long sides along the long sides of the side faces 5 and 6. The main electrode 122 includes a pair of edges 129*a* and 129*b* extending in its longitudinal direction. The edges 129*a* and 129*b* are adjacent to the side faces 1 and 4, respectively. The main electrode 122 includes a region functioning as a capacitor. The region functioning as a capacitor overlaps with a main electrode 132 of the second inner electrode 131 described below, as viewed from the laminating direction of the insulating layers 18. In this embodiment, the main electrode 122 entirely overlaps with the main electrode 132. Therefore, the substantially entire region of the main electrode 122 functions as a capacitor.

The coupling conductor 123 is adjacent to the side face 2 and is connected to the main electrode 122. The coupling conductor 123 extends from the main electrode 122 toward the side face 2 of the body E1.

The coupling conductor 124 is adjacent to the side face 4 and is connected to the main electrode 122. The coupling conductor 124 extends from the edge 129*b* of the main electrode 122 toward the side face 4 of the body E1.

The lead conductor 127 has an end connected to the coupling conductor 124, and extends toward the side face 2 along the side face 4 of the body E1 so as to define a gap between the lead conductor 127 and the main electrode 122. In the lead conductor 127, its edge adjacent to the side face 4 is exposed from the side face 4 to be electrically and physically connected to the first terminal electrode 10. In the extending direction of the lead conductor 127, the coupling conductor 124 has a length shorter than the lengths of the lead conductor 127 and of the main electrode 122.

The lead conductor 125 is connected to the lead conductor 127 and the coupling conductor 123. More specifically, one end of the lead conductor 125 is connected to the lead conductor 127, and the other end of the lead conductor 125 is connected to the coupling conductor 123. The lead conductor 125 extends along the side face 2 of the body E1 so as to define a gap between the lead conductor 125 and the main electrode 122. In the lead conductor 125, its edge adjacent to the side face 2 is exposed from the side face 2 to be electrically and physically connected to the first terminal electrode 10.

The lead conductor 128 extends from the main electrode 122 to the side face 4. One end of the lead conductor 128 is connected to the main electrode 122, and the other end of the lead conductor 128 is exposed from the side face 4 to be electrically and physically connected to the first connection conductor 14. The lead conductor 128 extends from the edge 129*b* of the main electrode 122 toward the side face 4 of the body E1. The lead conductor 128 is disposed between the coupling conductors 124 and 133, as viewed from the direction perpendicular to the side faces 1 and 4.

With reference to FIG. 16(*b*), the second inner electrode 131 has a main electrode 132, coupling conductor 133 and 134, and lead conductors 135 and 136.

The rectangular main electrode 132 has long sides along the long sides of the side faces 5 and 6. The main electrode 132 includes a pair of edges 139*a* and 139*b* extending in its longitudinal direction. The edges 139*a* and 139*b* are adjacent to the side faces 1 and 4, respectively. The main electrode 132 includes a region functioning as a capacitor. The region functioning as a capacitor overlaps with the main electrode 122 of the first inner electrode 121, as viewed from the laminating direction of the insulating layers 18. In this embodiment, the main electrode 122 entirely overlaps with the main electrode 132. Therefore, the substantially entire region of the main electrode 132 functions as a capacitor.

The coupling conductor 133 is adjacent to the side face 1 and is connected to the main electrode 132. The coupling conductor 133 extends from the edge 139*a* of the main electrode 132 toward the side face 1 of the body E1.

The lead conductor 136 has an end connected to the coupling conductor 133, and extends toward the side face 3 along the side face 1 of the body E1 so as to define a gap between the lead conductor 136 and the main electrode 132. In the lead conductor 136, its edge adjacent to the side face 1 is exposed from the side face 1 to be electrically and physically connected to the second terminal electrode 12. In the extending direction of the lead conductor 136, the coupling conductor 133 has a length shorter than the lengths of the lead conductor 136 and of the main electrode 132.

The coupling conductor 134 is adjacent to the side face 3 and is connected to the main electrode 132. The coupling conductor 134 extends from the main electrode 132 toward the side face 3 of the body E1.

The lead conductor 135 is connected to the lead conductor 136 and the coupling conductor 134. More specifically, one end of the lead conductor 135 is connected to the lead conductor 136, and the other end of the lead conductor 135 is connected to the coupling conductor 134. The lead conductor 135 extends along the side face 3 of the body E1 so as to define a gap between the lead conductor 135 and the main electrode 132. In the lead conductor 135, its edge adjacent to the side face 3 is exposed from the side face 3 to be electrically and physically connected to the second terminal electrode 12.

With reference to FIG. 16(*c*), the third inner electrode 141 has a main electrode 142 and a lead conductor 143.

The rectangular main electrode 142 has long sides along the long sides of the side faces 5 and 6. The main electrode 142 includes a pair of edges 145*a* and 145*b* extending in its longitudinal direction. The edges 145*a* and 145*b* are adjacent to the side faces 1 and 4, respectively. The main electrode 142 includes a region functioning as a capacitor. The region functioning as a capacitor overlaps with the main electrode 122 of the first inner electrode 121 and the main electrode 132 of the second inner electrode 131, as viewed from the laminating direction of the insulating layers 18. In this embodiment, the main electrode 142 entirely overlaps with the main electrodes 122 and 132. Therefore, the substantially entire region of the main electrode 142 functions as a capacitor.

The lead conductor 143 extends from the main electrode 142 to the side face 4. One end of the lead conductor 143 is connected to the main electrode 142, and the other end of the lead conductor 143 is exposed from the side face 4 to be electrically and physically connected to the first connection conductor 14. The lead conductor 143 extends from the edge 145b of the main electrode 142 toward the side face 4 of the body E1. The lead conductor 143 is disposed between the coupling conductors 124 and 133, as viewed from the direction perpendicular to the side faces 1 and 4.

In the multilayer capacitor of this embodiment having the structure described above, the coupling conductors 124 and 133 connect the lead conductors 127 and 136 to the main electrodes 122 and 132 in the first and second inner electrodes 121 and 131, respectively. In the extending direction of the lead conductor 127, the coupling conductor 124 has a length shorter than the lengths of the lead conductor 127 and of the main electrode 122. In the extending direction of the lead conductor 136, the coupling conductor 133 has a length shorter than the lengths of the lead conductor 136 and of the main electrode 132. In other words, paths between the lead conductor 127 and the main electrode 122 and between the lead conductor 136 and the main electrode 132 are narrow. Accordingly, in the multilayer capacitor of this embodiment, partial narrow current paths formed in the first and second inner electrodes 121 and 131 increase its ESR.

The first inner electrode 121 is connected to the first terminal electrode 10 and the first connection conductor 14. The third inner electrode 141 is not connected to the first terminal electrode 10, but is connected to only the first connection conductor 14. In other words, the third inner electrode 141 is indirectly connected to the first terminal electrode 10 through the first inner electrode 121. This indirect connection of the inner electrodes to the terminal electrode ensures higher ESR of the multilayer capacitor of this embodiment.

The main electrodes 122 and 132 are adjacent to each other so as to sandwich the insulating layer 18. The main electrodes 122 and 132 connected to different terminal electrodes form a capacitance component during applying a voltage. Therefore, the multilayer capacitor of this embodiment surely can have capacitance.

Preferred embodiments of the present invention have been described above, but the present invention is not restricted to the embodiments.

For example, the number of the inner electrodes is not restricted to the embodiments, and other layouts on inner electrodes functioning as a capacitor may be used. For example, the first embodiment includes two pairs of the third and fourth inner electrodes 41 and 45, but any other number of the pairs may be used. The first embodiment includes one pair of the first and second inner electrodes 21 and 31, but any other number of the pairs may be used. For two pairs of the first and second inner electrodes 21 and 31, the first inner electrode 21, the second inner electrode 31, the third inner electrode 41, the fourth inner electrode 45, the third inner electrode 41, the fourth inner electrode 45, the second inner electrode 31, and the first inner electrode 21 are preferably laminated in that order.

In the embodiments described above, the facing main electrodes entirely overlap with each other. Instead, they may partially overlap with each other.

All the main electrodes 42, 92, and 142 in the multilayer capacitor do not have to be connected to only the first connection conductor 14. In other words, the third inner electrodes 41, 91, or 141 less than the total number of third inner electrodes 41, 91, or 141 may be connected to not only the first connection conductor 14 but also the first terminal electrode 10. Similarly, fourth inner electrodes 45 less than the total number of fourth inner electrodes 45 may be connected to not only the second connection conductor 16 but also the second terminal electrode 12.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a body having a plurality of laminated insulating layers,
   a first inner electrode, a second inner electrode, and a third inner electrode, these layers being separated by the insulating layers in the body, and
   a first terminal electrode, a second terminal electrode, and a first connection conductor on the outer surface of the body, the first and second terminal electrodes and the first connection conductor being insulated from each other on the outer surface of the body;
   the first inner electrode having:
      a first main electrode,
      at least two first lead conductors extending so as to define a gap between the at least two first lead conductors and the first main electrode, exposed from the body, and connected to the first terminal electrode,
      at least two first coupling conductors connecting the first main electrode to the at least two first lead conductors, and
      a second lead conductor extending from the first main electrode, exposed from the body, and connected to the first connection conductor;
   the second inner electrode having:
      a second main electrode overlapping with the first main electrode, as viewed from a laminating direction of the insulating layers,
      at least two third lead conductors extending so as to define a gap between the at least two third lead conductors and the second main electrode, exposed from the body, and connected to the second terminal electrode, and
      at least two second coupling conductors connecting the second main electrode to the at least two third lead conductors;
   the third inner electrode having:
      a third main electrode overlapping with the first and second main electrode, as viewed from the laminating direction, and
      a fourth lead conductor extending from the third main electrode, exposed from the body, and connected to the first connection conductor, the third inner electrode being connected to only the first connection conductor;
   the at least two first coupling conductors having a length shorter than the lengths of the at least two first lead conductors and of the main first electrode in the extending direction of the at least two first lead conductors, the at least two second coupling conductors having a length shorter than the lengths of the at least two third lead conductors and of the second main electrode in the extending direction of the at least two third lead conductors;

the second inner electrode being adjacent to at least one of the first and third inner electrodes so as to sandwich the insulating layer;

the first main electrode being connected to the at least two first lead conductors only through the at least two first coupling conductors;

the second main electrode being connected to the at least two third lead conductors only through the at least two second coupling conductors;

the body including a first side face parallel to the laminating direction, a second side face parallel to the laminating direction, a third side face facing the second side face, and a fourth side face facing the first side face, the second and third side faces being connected to the first side face and fourth side face;

the first terminal electrode being continuously formed on the first, second, and fourth side face, the second terminal electrode being continuously formed on the first, third, and fourth side face;

in the first inner electrode, one of the at least two first coupling conductors extending from an edge of the first main electrode adjacent to the first side face toward the first side face, another of the at least two first coupling conductors extending from an edge of the first main electrode adjacent to the fourth side face toward the fourth side face, one of the at least two first lead conductors extending along the first side face, another of the at least two first lead conductors extending along the fourth side face;

in the second inner electrode, one of the at least two second coupling conductors extending from an edge of the second main electrode adjacent to the first side face toward the first side face, another of the at least two second coupling conductors extending from an edge of the second main electrode adjacent to the fourth side face toward the fourth side face, one of the at least two third lead conductors extending along the first side face, another of the at least two third lead conductors extending along the fourth side face;

the one of the at least two first lead conductors and the one of the at least two third lead conductors being exposed from the first side face, and being connected to the first and second terminal electrodes, respectively;

the another of the at least two first lead conductors and the another of the at least two third lead conductors being exposed from the fourth side face, and being connected to the first and second terminal electrodes, respectively;

the first inner electrode further having a seventh lead conductor connected to at least one of the at least two first lead conductors, the seventh lead conductor extending along the second side face so as to define a gap between the seventh lead conductor and the first main electrode, being exposed from the second side face, and being connected to the first terminal electrode;

the second inner electrode further having an eighth lead conductor connected to at least one of the at least two third lead conductors, the eighth lead conductor extending along the third side face so as to define a gap between the eighth lead conductor and the second main electrode, being exposed from the third side face, and being connected to the second terminal electrode;

the first main electrode being connected to the first terminal electrode only through the at least two first lead conductors, the at least two first coupling conductors, and the seventh lead conductor; and the second main electrode being connected to the second terminal electrode only through the at least two third lead conductors, the at least two second coupling conductors, and the eighth lead conductor.

2. The multilayer capacitor according to claim 1, wherein the second inner electrode is adjacent to the first inner electrode so as to sandwich the insulating layer.

3. The multilayer capacitor according to claim 2, wherein the third inner electrode is adjacent to the second inner electrode so as to sandwich the insulating layer.

4. The multilayer capacitor according to claim 1, further comprising:
a second connection conductor on the outer surface of the body, the second connection conductor being insulated from the first and second terminal electrodes and the first connection conductor on the outer surface of the body; and
a fourth inner electrode separated by the insulating layers in the body;
wherein the second inner electrode further includes a fifth lead conductor extending from the second main electrode, exposed from the body, and connected to the second connection conductor;
the fourth inner electrode having a fourth main electrode overlapping with the first to third main electrodes, as viewed from the laminating direction; and a sixth lead conductor extending from the fourth main electrode, exposed from the body, and connected to the second connection conductor;
the fourth inner electrode being connected to only the second connection conductor.

5. The multilayer capacitor according to claim 4, wherein the fourth inner electrode is adjacent to at least one of the first and third inner electrodes so as to sandwich the insulating layer.

* * * * *